United States Patent
Kocienda

(10) Patent No.: US 9,442,654 B2
(45) Date of Patent: *Sep. 13, 2016

(54) APPARATUS AND METHOD FOR CONDITIONALLY ENABLING OR DISABLING SOFT BUTTONS

(71) Applicant: Apple Inc., Cupertino, CA (US)

(72) Inventor: Kenneth L. Kocienda, San Jose, CA (US)

(73) Assignee: Apple Inc., Cupertino, CA (US)

( * ) Notice: Subject to any disclaimer, the term of this patent is extended or adjusted under 35 U.S.C. 154(b) by 245 days.

This patent is subject to a terminal disclaimer.

(21) Appl. No.: 14/094,735

(22) Filed: Dec. 2, 2013

(65) Prior Publication Data

US 2014/0089839 A1 Mar. 27, 2014

Related U.S. Application Data

(63) Continuation of application No. 12/788,283, filed on May 26, 2010, now Pat. No. 8,621,380, which is a continuation of application No. PCT/US2010/020263, filed on Jan. 6, 2010.

(51) Int. Cl.
*H03M 11/00* (2006.01)
*G06F 3/0488* (2013.01)
(Continued)

(52) U.S. Cl.
CPC ......... *G06F 3/04886* (2013.01); *G06F 1/3203* (2013.01); *G06F 3/0236* (2013.01); *G06F 3/041* (2013.01)

(58) Field of Classification Search
CPC ........... G06F 3/04886; G06F 3/04883; G06F 3/0236; G06F 1/3203
USPC ....................................... 715/773, 835, 863
See application file for complete search history.

(56) References Cited

U.S. PATENT DOCUMENTS 2,794,861 A 6/1957 Heine
4,081,631 A 3/1978 Feder
(Continued)

FOREIGN PATENT DOCUMENTS

CN 1666170 A 9/2005
CN 1668994 A 9/2005
(Continued)

OTHER PUBLICATIONS

Office Action received for European Patent Application No. 10700014.3, mailed on Aug. 25, 2015, 8 pages.
(Continued)

*Primary Examiner* — Alvin Tan
*Assistant Examiner* — Rinna Yi
(74) *Attorney, Agent, or Firm* — Morrison & Foerster LLP

(57) ABSTRACT

A method of operating a multifunction device includes displaying a soft keyboard having a plurality of buttons including one or more unconditionally enabled buttons and one or more conditionally enabled buttons. The method further includes detecting a first input with a first button at a first time; detecting a second input with a second button at a second time after the first time, where the second button is a conditionally enabled button; and in response to the detecting the second input with the second button at the second time: in accordance with a determination that the period of time between the first time and the second time is above a predefined threshold, activating the second button; and in accordance with a determination that the period of time between the first time and the second time is below the predefined threshold, preventing the second button from being activated.

18 Claims, 19 Drawing Sheets

(51) Int. Cl.
*G06F 1/32* (2006.01)
*G06F 3/023* (2006.01)
*G06F 3/041* (2006.01)

(56) References Cited

U.S. PATENT DOCUMENTS

| | | | |
|---|---|---|---|
| 4,107,784 A | 8/1978 | Van Bemmelen | |
| 4,202,041 A | 5/1980 | Kaplow et al. | |
| 4,204,089 A | 5/1980 | Key et al. | |
| 4,313,108 A | 1/1982 | Yoshida | |
| 4,332,464 A | 6/1982 | Bartulis et al. | |
| 4,334,219 A | 6/1982 | Paulus et al. | |
| 4,353,056 A | 10/1982 | Tsikos | |
| 4,433,377 A | 2/1984 | Eustis et al. | |
| 4,455,452 A | 6/1984 | Schuyler | |
| 4,459,581 A | 7/1984 | Wilson et al. | |
| 4,485,439 A | 11/1984 | Rothstein | |
| 4,504,133 A | 3/1985 | Nakai et al. | |
| 4,513,379 A | 4/1985 | Wilson et al. | |
| 4,555,775 A | 11/1985 | Pike | |
| 4,586,158 A | 4/1986 | Brandle | |
| 4,598,363 A | 7/1986 | Clark et al. | |
| 4,642,790 A | 2/1987 | Minshull et al. | |
| 4,658,425 A | 4/1987 | Julstrom | |
| 4,680,429 A | 7/1987 | Murdock et al. | |
| 4,698,625 A | 10/1987 | Mccaskill et al. | |
| 4,746,770 A | 5/1988 | Mcavinney | |
| 4,755,811 A | 7/1988 | Slavin et al. | |
| 4,790,028 A | 12/1988 | Ramage | |
| 4,803,463 A | 2/1989 | Sado | |
| 4,812,831 A | 3/1989 | Laier | |
| 5,347,295 A | 9/1994 | Agulnick et al. | |
| 5,729,219 A | 3/1998 | Armstrong et al. | |
| 5,905,497 A | 5/1999 | Vaughan et al. | |
| 6,037,937 A | 3/2000 | Beaton et al. | |
| 6,154,758 A | 11/2000 | Chiang | |
| 6,307,549 B1 | 10/2001 | King et al. | |
| 6,486,895 B1 | 11/2002 | Robertson et al. | |
| 6,657,560 B1 * | 12/2003 | Jung | G06F 3/0213 341/22 |
| 6,842,182 B2 | 1/2005 | Ungar et al. | |
| 6,924,822 B2 | 8/2005 | Card et al. | |
| 6,944,818 B2 | 9/2005 | Newman et al. | |
| 6,947,062 B2 | 9/2005 | Cuijpers et al. | |
| 6,995,746 B2 | 2/2006 | Aymeric | |
| 7,088,342 B2 | 8/2006 | Rekimoto et al. | |
| 7,176,888 B2 | 2/2007 | Marvit et al. | |
| 7,185,274 B1 | 2/2007 | Rubin et al. | |
| 7,190,349 B2 | 3/2007 | Kim et al. | |
| 7,299,424 B2 | 11/2007 | Jarrett et al. | |
| 7,383,517 B2 | 6/2008 | Baudisch et al. | |
| 7,434,177 B1 | 10/2008 | Ording et al. | |
| 7,437,683 B1 | 10/2008 | Beezer et al. | |
| 7,477,231 B2 | 1/2009 | Asai | |
| 7,602,378 B2 | 10/2009 | Kocienda et al. | |
| 7,614,008 B2 | 11/2009 | Ording | |
| 7,634,263 B2 | 12/2009 | Louch et al. | |
| 7,768,501 B1 | 8/2010 | Maddalozzo, Jr. et al. | |
| 8,033,744 B2 | 10/2011 | Baker | |
| 8,289,162 B2 | 10/2012 | Mooring et al. | |
| 8,347,232 B1 | 1/2013 | Prud"Hommeaux et al. | |
| 8,358,321 B1 | 1/2013 | Weidner | |
| 8,365,059 B2 | 1/2013 | Walsh et al. | |
| 8,368,658 B2 | 2/2013 | Brisebois et al. | |
| 8,405,630 B1 | 3/2013 | Bi et al. | |
| 8,448,083 B1 | 5/2013 | Migos et al. | |
| 8,520,025 B2 | 8/2013 | Patterson et al. | |
| 8,842,082 B2 | 9/2014 | Migos et al. | |
| 8,850,350 B2 | 9/2014 | Bi et al. | |
| 9,026,932 B1 | 5/2015 | Dixon | |
| 9,104,647 B2 | 8/2015 | Artin | |
| 9,113,193 B1 | 8/2015 | Gardes et al. | |
| 9,117,426 B2 | 8/2015 | Wieder | |
| 2002/0015064 A1 | 2/2002 | Robotham et al. | |
| 2002/0028018 A1 | 3/2002 | Hawkins et al. | |
| 2002/0105504 A1 * | 8/2002 | Toepke | G06F 3/04886 345/173 |
| 2002/0118175 A1 | 8/2002 | Liebenow et al. | |
| 2003/0001899 A1 | 1/2003 | Partanen et al. | |
| 2003/0184528 A1 | 10/2003 | Kawasaki et al. | |
| 2003/0210272 A1 | 11/2003 | D'Souza | |
| 2004/0021691 A1 | 2/2004 | Dostie et al. | |
| 2004/0068409 A1 | 4/2004 | Tanaka et al. | |
| 2004/0080487 A1 | 4/2004 | Griffin et al. | |
| 2004/0100479 A1 | 5/2004 | Nakano et al. | |
| 2004/0119750 A1 | 6/2004 | Harrison | |
| 2004/0140984 A1 | 7/2004 | Hinckley et al. | |
| 2004/0183834 A1 | 9/2004 | Chermesino | |
| 2004/0201576 A1 * | 10/2004 | Shimada | G06F 3/018 345/173 |
| 2004/0230912 A1 | 11/2004 | Clow et al. | |
| 2005/0154798 A1 | 7/2005 | Nurmi | |
| 2005/0164798 A1 | 7/2005 | Rayburn | |
| 2005/0225538 A1 | 10/2005 | Verhaegh | |
| 2005/0248525 A1 | 11/2005 | Asai | |
| 2006/0007178 A1 | 1/2006 | Davis | |
| 2006/0033724 A1 | 2/2006 | Chaudhri et al. | |
| 2006/0038796 A1 | 2/2006 | Hinckley et al. | |
| 2006/0048072 A1 | 3/2006 | Jarrett et al. | |
| 2006/0055685 A1 | 3/2006 | Rimas-Ribikauskas et al. | |
| 2006/0061542 A1 | 3/2006 | Stokic | |
| 2006/0080621 A1 | 4/2006 | Park | |
| 2006/0085757 A1 | 4/2006 | Andre et al. | |
| 2006/0150087 A1 | 7/2006 | Cronenberger et al. | |
| 2006/0152389 A1 | 7/2006 | Kajikawa | |
| 2006/0164399 A1 | 7/2006 | Cheston et al. | |
| 2006/0181518 A1 | 8/2006 | Shen et al. | |
| 2006/0197750 A1 | 9/2006 | Kerr et al. | |
| 2006/0242607 A1 | 10/2006 | Hudson | |
| 2006/0265648 A1 | 11/2006 | Rainisto et al. | |
| 2007/0060228 A1 | 3/2007 | Akasaka et al. | |
| 2007/0091070 A1 | 4/2007 | Larsen et al. | |
| 2007/0097085 A1 | 5/2007 | Iwatsuki | |
| 2007/0171210 A1 | 7/2007 | Chaudhri et al. | |
| 2007/0273662 A1 | 11/2007 | Lian et al. | |
| 2007/0277126 A1 | 11/2007 | Park et al. | |
| 2008/0036743 A1 | 2/2008 | Westerman et al. | |
| 2008/0042978 A1 | 2/2008 | Perez-Noguera | |
| 2008/0082920 A1 | 4/2008 | Eom | |
| 2008/0115078 A1 | 5/2008 | Girgaonkar | |
| 2008/0122796 A1 | 5/2008 | Jobs et al. | |
| 2008/0134101 A1 | 6/2008 | Newman | |
| 2008/0141126 A1 | 6/2008 | Johnson et al. | |
| 2008/0158024 A1 | 7/2008 | Steiner et al. | |
| 2008/0165141 A1 | 7/2008 | Christie | |
| 2008/0165144 A1 | 7/2008 | Forstall et al. | |
| 2008/0180408 A1 | 7/2008 | Forstall et al. | |
| 2008/0259057 A1 | 10/2008 | Brons | |
| 2008/0297377 A1 | 12/2008 | Wang et al. | |
| 2009/0052778 A1 | 2/2009 | Edgecomb et al. | |
| 2009/0058815 A1 | 3/2009 | Jeon et al. | |
| 2009/0058820 A1 | 3/2009 | Hinckley | |
| 2009/0058823 A1 | 3/2009 | Kocienda | |
| 2009/0064047 A1 | 3/2009 | Shim et al. | |
| 2009/0091541 A1 | 4/2009 | Chen | |
| 2009/0122018 A1 | 5/2009 | Vymenets et al. | |
| 2009/0132957 A1 | 5/2009 | Reddy | |
| 2009/0140986 A1 | 6/2009 | Karkkainen et al. | |
| 2009/0153288 A1 | 6/2009 | Hope et al. | |
| 2009/0167706 A1 | 7/2009 | Tan et al. | |
| 2009/0174669 A1 | 7/2009 | Shkolnikov | |
| 2009/0174679 A1 | 7/2009 | Westerman | |
| 2009/0189858 A1 | 7/2009 | Lev et al. | |
| 2009/0195959 A1 | 8/2009 | Ladouceur et al. | |
| 2009/0213081 A1 | 8/2009 | Case, Jr. | |
| 2009/0225035 A1 | 9/2009 | Baik | |
| 2009/0225041 A1 | 9/2009 | Kida et al. | |
| 2009/0228842 A1 | 9/2009 | Westerman et al. | |
| 2009/0231281 A1 | 9/2009 | Whytock et al. | |
| 2009/0235281 A1 | 9/2009 | Lu et al. | |
| 2009/0237359 A1 | 9/2009 | Kim et al. | |
| 2009/0237361 A1 | 9/2009 | Mosby et al. | |
| 2009/0241054 A1 | 9/2009 | Hendricks | |
| 2009/0243898 A1 | 10/2009 | Iorfida et al. | |

(56) References Cited

U.S. PATENT DOCUMENTS

| | | |
|---|---|---|
| 2009/0244020 A1 | 10/2009 | Sjolin |
| 2009/0247233 A1 | 10/2009 | Kim |
| 2009/0251422 A1 | 10/2009 | Wu et al. |
| 2009/0256817 A1 | 10/2009 | Perlin et al. |
| 2009/0258677 A1 | 10/2009 | Ellis et al. |
| 2009/0265627 A1 | 10/2009 | Kim et al. |
| 2009/0267906 A1 | 10/2009 | Schroderus |
| 2009/0273566 A1 | 11/2009 | Lu et al. |
| 2009/0303200 A1 | 12/2009 | Grad |
| 2009/0309768 A1* | 12/2009 | Pihlaja .................. H03M 11/02 341/24 |
| 2010/0004029 A1 | 1/2010 | Kim |
| 2010/0020033 A1 | 1/2010 | Nwosu |
| 2010/0020034 A1 | 1/2010 | Kim |
| 2010/0058212 A1 | 3/2010 | Belitz et al. |
| 2010/0064261 A1 | 3/2010 | Andrews et al. |
| 2010/0070613 A1 | 3/2010 | Chen et al. |
| 2010/0088641 A1 | 4/2010 | Choi |
| 2010/0103124 A1 | 4/2010 | Kruzeniski et al. |
| 2010/0105408 A1 | 4/2010 | Palmer et al. |
| 2010/0107050 A1 | 4/2010 | Wang et al. |
| 2010/0110017 A1 | 5/2010 | Lee |
| 2010/0141590 A1 | 6/2010 | Markiewicz et al. |
| 2010/0146459 A1 | 6/2010 | Repka |
| 2010/0153313 A1 | 6/2010 | Baldwin et al. |
| 2010/0156793 A1 | 6/2010 | Ozias et al. |
| 2010/0164959 A1 | 7/2010 | Brown et al. |
| 2010/0185949 A1 | 7/2010 | Jaeger |
| 2010/0194692 A1 | 8/2010 | Orr et al. |
| 2010/0214237 A1 | 8/2010 | Echeverri et al. |
| 2010/0231612 A1 | 9/2010 | Chaudhri et al. |
| 2010/0235726 A1 | 9/2010 | Ording et al. |
| 2010/0235794 A1 | 9/2010 | Ording |
| 2010/0238125 A1 | 9/2010 | Ronkainen |
| 2010/0238139 A1 | 9/2010 | Goertz et al. |
| 2010/0241985 A1 | 9/2010 | Kim et al. |
| 2010/0259484 A1 | 10/2010 | Jo |
| 2010/0259493 A1 | 10/2010 | Chang et al. |
| 2010/0259561 A1 | 10/2010 | Forutanpour et al. |
| 2010/0259562 A1 | 10/2010 | Miyazawa et al. |
| 2010/0277414 A1 | 11/2010 | Tartz et al. |
| 2010/0283743 A1 | 11/2010 | Coddington |
| 2010/0289756 A1 | 11/2010 | Anzures et al. |
| 2010/0293498 A1 | 11/2010 | Maxfield |
| 2010/0295781 A1 | 11/2010 | Alameh et al. |
| 2010/0299597 A1 | 11/2010 | Shin et al. |
| 2010/0302155 A1 | 12/2010 | Sands et al. |
| 2010/0306363 A1 | 12/2010 | Saputra et al. |
| 2010/0315359 A1 | 12/2010 | Seong et al. |
| 2011/0006996 A1 | 1/2011 | Smith et al. |
| 2011/0007009 A1 | 1/2011 | Ishihara et al. |
| 2011/0009169 A1 | 1/2011 | Kim |
| 2011/0029918 A1 | 2/2011 | Yoo et al. |
| 2011/0039602 A1 | 2/2011 | McNamara et al. |
| 2011/0050607 A1 | 3/2011 | Park |
| 2011/0055753 A1 | 3/2011 | Horodezky et al. |
| 2011/0074699 A1 | 3/2011 | Marr et al. |
| 2011/0078560 A1 | 3/2011 | Weeldreyer et al. |
| 2011/0078614 A1 | 3/2011 | Lee et al. |
| 2011/0106439 A1 | 5/2011 | Huang et al. |
| 2011/0179387 A1 | 7/2011 | Shaffer et al. |
| 2011/0187647 A1 | 8/2011 | Woloszynski et al. |
| 2011/0191718 A1 | 8/2011 | Hinckley et al. |
| 2011/0191719 A1 | 8/2011 | Hinckley et al. |
| 2011/0199393 A1 | 8/2011 | Nurse et al. |
| 2011/0202877 A1 | 8/2011 | Lassonde et al. |
| 2011/0221684 A1 | 9/2011 | Rydenhag |
| 2011/0231796 A1 | 9/2011 | Vigil |
| 2011/0242138 A1 | 10/2011 | Tribble |
| 2011/0258537 A1 | 10/2011 | Rives et al. |
| 2011/0263298 A1 | 10/2011 | Park |
| 2011/0302532 A1 | 12/2011 | Missig |
| 2012/0046947 A1 | 2/2012 | Fleizach |
| 2012/0096345 A1 | 4/2012 | Ho et al. |
| 2012/0110431 A1 | 5/2012 | Rosenfeld et al. |
| 2012/0112024 A1 | 5/2012 | Götzl |
| 2012/0112025 A1 | 5/2012 | Smeenk |
| 2012/0112026 A1 | 5/2012 | Crawford |
| 2012/0113007 A1 | 5/2012 | Koch et al. |
| 2012/0113023 A1 | 5/2012 | Koch et al. |
| 2012/0113024 A1 | 5/2012 | Koch et al. |
| 2012/0113025 A1 | 5/2012 | Koch et al. |
| 2012/0113026 A1 | 5/2012 | Koch |
| 2012/0113126 A1 | 5/2012 | Koch et al. |
| 2012/0117501 A1 | 5/2012 | Koch et al. |
| 2012/0117505 A1 | 5/2012 | Koch et al. |
| 2012/0117506 A1 | 5/2012 | Koch et al. |
| 2012/0120016 A1 | 5/2012 | Mittal et al. |
| 2012/0127206 A1 | 5/2012 | Thompson et al. |
| 2012/0139844 A1 | 6/2012 | Ramstein et al. |
| 2012/0162078 A1 | 6/2012 | Ferren et al. |
| 2012/0188174 A1 | 7/2012 | Migos et al. |
| 2012/0192093 A1 | 7/2012 | Migos et al. |
| 2012/0206363 A1 | 8/2012 | Kyprianou et al. |
| 2012/0206370 A1 | 8/2012 | Ivanovic |
| 2012/0324381 A1 | 12/2012 | Cohen et al. |
| 2013/0002565 A1 | 1/2013 | Tumanov et al. |
| 2013/0016129 A1 | 1/2013 | Gossweiler, III et al. |
| 2013/0057475 A1 | 3/2013 | Duggan et al. |
| 2013/0067382 A1 | 3/2013 | Townsend et al. |
| 2013/0167013 A1 | 6/2013 | Poliak |
| 2013/0222244 A1 | 8/2013 | Mak et al. |
| 2013/0234949 A1 | 9/2013 | Chornenky |
| 2013/0265225 A1 | 10/2013 | Nasiri et al. |
| 2013/0286435 A1 | 10/2013 | Anezaki et al. |
| 2013/0311867 A1 | 11/2013 | Patterson et al. |
| 2014/0040835 A1 | 2/2014 | Hildreth et al. |
| 2014/0223381 A1 | 8/2014 | Huang et al. |
| 2014/0351691 A1 | 11/2014 | Neil et al. |
| 2015/0235370 A1 | 8/2015 | Abovitz et al. |

FOREIGN PATENT DOCUMENTS

| | | |
|---|---|---|
| CN | 1280700 C | 10/2006 |
| CN | 1307518 C | 3/2007 |
| EP | 1536316 A1 | 6/2005 |
| EP | 1703363 A2 | 9/2006 |
| EP | 1791051 A2 | 5/2007 |
| EP | 2105823 A1 | 9/2009 |
| EP | 2109031 A2 | 10/2009 |
| EP | 2133778 A2 | 12/2009 |
| EP | 2341414 A1 | 7/2011 |
| GB | 2402105 A | 12/2004 |
| JP | 6-59793 A | 3/1994 |
| JP | 8-152970 A | 6/1996 |
| JP | 2001-6587 A | 1/2001 |
| JP | 2002-508559 A | 3/2002 |
| JP | 2003-288155 A | 10/2003 |
| JP | 2005-117080 A | 4/2005 |
| JP | 2005-244301 A | 9/2005 |
| JP | 2005-526303 A | 9/2005 |
| JP | 2005-531861 A | 10/2005 |
| JP | 2006-139397 A | 6/2006 |
| JP | 2006-185064 A | 7/2006 |
| JP | 2007-279638 A | 10/2007 |
| JP | 2009-527041 A | 7/2009 |
| JP | 2009-181244 A | 8/2009 |
| JP | 2010-503127 A | 1/2010 |
| KR | 10-2005-0016691 A | 2/2005 |
| KR | 10-2009-0101741 A | 9/2009 |
| KR | 10-0975168 B1 | 8/2010 |
| TW | 200928943 A | 7/2009 |
| WO | 99/31571 A1 | 6/1999 |
| WO | 00/68771 A1 | 11/2000 |
| WO | 00/74240 A1 | 12/2000 |
| WO | 02/15211 A1 | 2/2002 |
| WO | 03/036795 A1 | 5/2003 |
| WO | 03/062978 A2 | 7/2003 |
| WO | 2004/006080 A2 | 1/2004 |
| WO | 2005/033856 A2 | 4/2005 |
| WO | 2005/076477 A1 | 8/2005 |
| WO | 2007/014064 A2 | 2/2007 |
| WO | 2007/089766 A2 | 8/2007 |
| WO | 2007/093984 A2 | 8/2007 |

(56) References Cited

FOREIGN PATENT DOCUMENTS

| WO | 2009/049331 A2 | 4/2009 |
|---|---|---|
| WO | 2009/084147 A1 | 7/2009 |
| WO | 2010/018579 A2 | 2/2010 |
| WO | 2010/089740 A1 | 8/2010 |
| WO | 2010/117374 A1 | 10/2010 |
| WO | 2011/123099 A1 | 10/2011 |
| WO | 2012/083499 A1 | 6/2012 |

OTHER PUBLICATIONS

Notice of Allowance received for U.S. Appl. No. 13/076,414, mailed on Aug. 26, 2015, 7 pages.
Notice of Allowance received for U.S. Appl. No. 13/077,754, mailed on Sep. 18, 2015, 6 pages.
Office Action received for Chinese Patent Application No. 201180026541.6, mailed on Jul. 16, 2015, 10 pages (3 pages of English Translation and 7 pages of Official Copy).
Office Action Received for Chinese Patent Application No. 201180059590.X, mailed on Aug. 4, 2015, 15 pages (7 pages of English Translation and 8 pages of Official Copy).
Liao et al., "PACER: Fine-grained Interactive Paper via Camera-touch Hybrid Gestures on a Cell Phone", CHI 2010, ACM, Apr. 10-15, 2010, 10 pages.
Nature, "The Textbook of the Future", Nature, vol. 458, Apr. 2009, pp. 568-570.
Dutch Search Report and Written Opinion received for Dutch Patent Application No. 2007725, mailed on May 23, 2012, 12 pages.
Dutch Search Report and Written Opinion received for Dutch Patent Application No. 2007718, mailed on May 14, 2012, 10 pages.
Dutch Search Report and Written Opinion received for Dutch Patent Application No. 2007719, mailed on May 14, 2012, 10 Pages.
European Search Report and Written Opinion received for Dutch Patent Application No. 2007721, mailed on May 4, 2012, 16 pages.
European Search Report and Written Opinion received for Dutch Patent Application No. 2007722, mailed on May 4, 2012, 10 pages.
European Search Report and Written Opinion received for Dutch Patent Application No. 2007723, mailed on May 4, 2012, 10 pages.
International Preliminary Report on Patentability received for PCT Patent Application No. PCT/US2011/059085, mailed on May 7, 2013, 10 pages.
International Search Report and Written Opinion received for PCT Patent Application No. PCT/US2011/059085, mailed on May 7, 2012, 17 pages.
International Preliminary Report on Patentability received for PCT Patent Application No. PCT/US2011/059088, mailed on May 16, 2013, 10 pages.
International Search Report and Written Opinion received for PCT Patent Application No. PCT/US2011/059088, mailed on May 7, 2012, 12 pages.
International Preliminary Report on Patentability received for PCT Patent Application No. PCT/US2011/059092, mailed on May 16, 2013, 12 pages.
International Search Report and Written Opinion received for PCT Patent Application No. PCT/US2011/059092, mailed on Feb. 11, 2013, 21 pages.
Invitation to Pay Additional Fees received for PCT Patent Application No. PCT/US2011/059092, mailed on May 23, 2012, 9 pages.
International Preliminary Report on Patentability received for PCT Patent Application No. PCT/US2011/059101, mailed on May 16, 2013, 10 pages.
International Search Report and Written Opinion received for PCT Patent Application No. PCT/US2011/059101, mailed on May 7, 2012, 12 pages.
International Preliminary Report on Patentability received for PCT Patent Application No. PCT/US2011/059106, mailed on May 16, 2013, 10 pages.
International Search Report and Written Opinion received for PCT Patent Application No. PCT/US2011/059106, mailed on May 7, 2012, 13 pages.
International Preliminary Report on Patentability received for PCT Patent Application No. PCT/US2011/059204, mailed on May 16, 2013, 8 pages.
International Search Report and Written Opinion received for PCT Patent Application No. PCT/US2011/059204, mailed on May 7, 2012, 10 pages.
International Search Report and Written Opinion received for PCT Patent Application No. PCT/US2010/020263, mailed on Dec. 8, 2010, 12 pages.
International Search Report and Written Opinion received for PCT Patent Application No. PCT/US2011/029957, mailed on May 23, 2011, 11 pages.
Non-Final Office Action received for U.S. Appl. No. 12/752,003, mailed on Feb. 22, 2013, 35 pages.
Non-Final Office Action received for U.S. Appl. No. 13/076,389, mailed on Oct. 3, 2012, 10 pages.
Notice of Allowance received for U.S. Appl. No. 13/076,389, mailed on May 2, 2013, 6 pages.
Notice of Allowance received for U.S. Appl. No. 13/076,389, mailed on May 28, 2013, 6 pages.
Non-Final Office Action received for U.S. Appl. No. 13/076,391, mailed on Feb. 7, 2013, 17 pages.
Non-Final Office Action received for U.S. Appl. No. 13/076,392, mailed on Nov. 2, 2012, 8 pages.
Non-Final Office Action received for U.S. Appl. No. 13/076,393, mailed on Nov. 2, 2012, 8 pages.
Non-Final Office Action received for U.S. Appl. No. 13/076,395, mailed on Dec. 13, 2012, 13 pages.
Non-Final Office Action received for U.S. Appl. No. 13/076,397, mailed on Dec. 14, 2012, 16 pages.
Non-Final Office Action received for U.S. Appl. No. 13/076,399, mailed on Feb. 12, 2013, 24 pages.
Non-Final Office Action received for U.S. Appl. No. 13/076,401, mailed on Dec. 17, 2012, 12 pages.
Non-Final Office Action received for U.S. Appl. No. 13/076,411, mailed on Jun. 13, 2013, 9 pages.
Non-Final Office Action received for U.S. Appl. No. 13/077,754, mailed on Nov. 9, 2012, 9 pages.
Non-Final Office Action received for U.S. Appl. No. 13/243,599, mailed on Jan. 17, 2013, 14 pages.
Notice of Allowance received for U.S. Appl. No. 12/788,283, mailed on Sep. 16, 2013, 16 pages.
Non-Final Office Action received for U.S. Appl. No. 12/788,283, mailed on May 11, 2012, 12 pages.
Non-Final Office Action received for U.S. Appl. No. 12/788,283, mailed on Oct. 12, 2012, 14 pages.
Notice of Allowance received for U.S. Appl. No. 12/788,283, mailed on May 9, 2013, 13 pages.
Office Action received for Australian Patent Application No. 20100340370, issued on May 31, 2013, 3 pages.
Ajidev, "iAnnotate", available at <www.ajidev.com/iannotate>, 2010, 2 pages.
Ajidev, "Welcome to iAnnotate V 1.3L", available at <www.ajidev.com>, 2010, 37 pages.
Blind Type, "Touch Typing the Way it should be", 2010, 2 pages.
Chen et al., "Navigation Techniques for Dual-Display E-Book Readers", CHI 2008 Proceedings, Apr. 2008, 10 pages.
concept phones.com, "Apple Tablet", available at <http://www.concept-phones.com/?s=apple+tablet>, Dec. 16, 2009, 21 pages.
crackberry.com, "Quick Way to Hide Keyboard?", available at <http://forums.crackberry.com/f86/quick-way-hide-keyboard-103108/>, Nov. 26, 2008, 6 pages.
Find Ebook Readers, "PDF on the iPad-iAnnotate Review-Annotations!", Find eBook Readers Blog, available at <http://findebookreaders.com/blog/2010/05/pdf-on-the-ipad-iannotate-review-annotations/>, May 2010, 9 pages.
G.P. Imports, Inc., "Keyboard Upgrade", updated May 20, 2010, 8 pages.
gizmodo.com, "How will We Type on the Apple Tablet?", available at <http://gizmodo.com/5446652/how-will-we-type-on-the-apple-tablet>, Jan. 12, 2010, 5 pages.
goodiware.com, "GoodReader User Manual: Viewing PDF Files", available at <http://www.goodreader.net/gr-man-view-pdf.html#annots>, 2010, 11 pages.

(56) References Cited

OTHER PUBLICATIONS

HTC Corporation, "DROID ERIS User Guide", available at <http://member.america.htc.com/download/Web_materials/Manual/DROID_ERIS_Verizon/DROID_ERIS_Verizon_English_UM_11_5.pdf>, 2009, 238 pages.
Lee et al., "SmartNote for iPad User Guide", Version 1.4, available at <http://mysmartnote.net>, 2010, 17 pages.
mobipocket.com, "Mobipocket Reader Desktop 6.2", available at <http://www.mobipocket.com/en/downloadsoft/productdetailsreader.asp>, 2010, 3 pages.
Readdle Inc., "PDF Expert for iPad User's Guide", 2010, 15 pages.
Robbin, Scott, "Concept: iPad Split Keyboard", available at <http://srobbin.com/blog/concept-ipad-split-keyboard/>, Jan. 27, 2010, 3 pages.
Surur, "Microsoft Patents Cool Multi-Touch Virtual Keyboard", available at <http://wmpoweruser.com/microsoft-patents-cool-multi-touch-virtual-keyboard/>, Sep. 25, 2009.
Tidwell, Jenifer, "Magnetism", Designing Interfaces, 2006, pp. 279-280.
Toshiba, "Libretto W100", Jun. 2010, 9 pages.
vimeo.com, "Smart Design Magazine UX Concept", available at <http://vimeo.com/10813230>, 2010, 2 pages.
Willems et al., "Pen Gestures in Online Map and Photograph Annotation Tasks", Oct. 2006, 6 pages.
XDA-Developers, "FingerKeyboard2.1", available at <http://forum.xda-developers.com/showthread.php?t=487677>, retrieved on Apr. 16, 2013, 7 pages.
International Preliminary Report on Patentability received for PCT Patent Application No. PCT/US2010/020263, mailed on Jul. 19, 2012, 9 pages.
Notice of Acceptance received for Australian Patent Application No. 2010340370, mailed on Jun. 12, 2014, 2 pages.
Notice of Allowance received for Chinese Patent Application No. 201080001777.X, mailed on May 23, 2014, 3 pages (1 page of English Translation and 2 pages of Official copy).
Office Action received for European Patent Application No. 10700014.3, mailed on Aug. 29, 2013, 6 pages.
Notice of Allowance received for Japanese Patent Application No. 2012-547987, mailed on Aug. 1, 2014, 3 pages (See Communication under 37 CFR § 1.98(a) (3)).
Notice of Allowance received for Korean Patent Application No. 10-2012-7020604, mailed on Aug. 13, 2014, 2 pages (See Communication under 37 CFR § 1.98(a) (3)).
Office Action received for Taiwan Patent Application No. 100100528, issued on Dec. 2, 2013, 10 pages (4 pages of English Translation and 6 pages of Official copy).
Notice of Allowance received for Taiwan Patent Application No. 100100528, mailed on Jun. 17, 2014, 3 pages (See Communication under 37 CFR § 1.98(a) (3)).
Office Action Received for Chinese Patent Application No. 201180059559.6, mailed on Sep. 11, 2015, 28 pages (19 pages of English Translation and 9 pages of Official Copy).
Notice of Allowance received for U.S. Appl. No. 13/076,391, mailed on Jun. 17, 2015, 10 pages.
Notice of Acceptance received for Australian Patent Application No. 2011323269, mailed on Apr. 16, 2015, 3 pages.
Final Office Action received for U.S. Appl. No. 13/797,979, mailed on May 8, 2015, 26 pages.
Notice of Allowance received for U.S. Appl. No. 14/083,349, mailed on Apr. 29, 2015, 9 pages.
Notice of Allowance received for U.S. Appl. No. 13/076,395, mailed on May 18, 2015, 9 pages.
Notice of Allowance received for U.S. Appl. No. 13/077,711, mailed on Nov. 28, 2014, 7 pages.
Final Office Action received for U.S. Appl. No. 13/077,754 mailed on Jan. 14, 2015, 16 pages.
Non Final Office Action received for U.S. Appl. No. 13/077,754, mailed on Mar. 21, 2014, 13 pages.
Non Final Office Action received for U.S. Appl. No. 13/077,754, mailed on Jul. 15, 2013, 11 pages.
Notice of Allowance received for U.S. Appl. No. 13/243,599, mailed on Aug. 6, 2013, 10 pages.
Non Final Office Action received for U.S. Appl. No. 13/797,979, mailed on Jan. 16, 2015, 26 pages.
Non-Final Office Action received for U.S. Appl. No. 14/083,349, mailed on May 27, 2014, 18 pages.
Notice of Allowance received for U.S. Appl. No. 14/083,349, mailed on Jan. 23, 2015, 9 pages.
Office Action received for Chinese Patent Application No. 201080001777.x, mailed on Jan. 28, 2013, 12 pages (English Translation only).
Office Action received for Chinese Patent Application No. 201080001777.x, mailed on Nov. 13, 2013, 9 pages (4 pages of English Translation and 5 pages of Official Copy).
Office Action received for Australian Patent Application No. 2011323269, issued on Aug. 5, 2013, 3 pages.
Office Action received for Australian Patent Application No. 2011323269, mailed on Sep. 3, 2014, 3 pages.
Office Action received for Australian Patent Application No. 2011323301, issued on Nov. 12, 2014, 3 pages.
Office Action received for Australian Patent Application No. 2011323375, mailed on Nov. 12, 2014, 4 pages.
Office Action received for Japanese Patent Application No. 2012-547987, mailed on Nov. 22, 2013, 5 pages (2 pages of English Translation and 3 pages of Official Copy).
Office Action received for Japanese Patent Application No. 2013-524269, mailed on Jul. 7, 2014, 5 pages (3 pages of English Translation and 2 pages of Official Copy).
Notice of Allowance received for Japanese Patent Application No. 2013-524269, mailed on Jan. 26, 2015, 3 pages (See Communication under 37 CFR § 1.98(a) (3)).
Office Action received for Japanese Patent Application No. 2013-537812, mailed on Mar. 7, 2014, 7 pages (4 pages of English translation and 3 pages of Official Copy).
Notice of Allowance received for Japanese Patent Application No. 2013-537813, mailed on Sep. 29, 2014, 3 pages (See Communication under 37 CFR § 1.98(a) (3)).
Office Action received for Japanese Patent Application No. 2013-537813, mailed on Apr. 4, 2014, 6 pages (4 pages of English Translation and 2 pages of Office Copy).
Office Action received for Japanese Patent Application No. 2013-537813, mailed on Aug. 8, 2014, 4 pages (2 pages of English Translation and 2 pages of Official Copy).
Notice of Allowance received for Japanese Patent Application No. 2013-537812, mailed on Dec. 5, 2014, 3 pages (See Communication under 37 CFR § 1.98(a) (3)).
Grossman et al., "The Bubble Cursor: Enhancing Target Acquisition by Dynamic Resizing of the Cursor's Activation Area", Papers: Smart Interaction Techniques 1, Apr. 2-7, 2005, pp. 281-290.
Guimbretiere, Francois, "Paper Augmented Digital Documents", CHI Letters, vol. 5, No. 2, 2003, pp. 51-60.
Gutwin et al., "Improving Interpretation of Remote Gestures with Telepointer Traces", In Proceedings of the 2002 ACM Conference on Computer Supported Cooperative Work, 2002, pp. 49-57.
Hertzum et al., "Input Techniques that Dynamically Change their Cursor Activation Area: A Comparison of Bubble and Cell Cursors", International Journal of Human-Computer Studies, vol. 65, No. 10, Oct. 2007, 38 pages.
Ren et al., "The Adaptive Hybrid Cursor: A Pressure-Based Target Selection Technique for Pen-Based User interfaces", Interact'07 Proceedings of the 11th IFIP TC 13 international conference on Human-computer interaction, Sep. 10, 2007, 14 pages.
Tidwell, Jenifer, "Magnetism", Designing Interfaces, Section 85, 2006, pp. 261-262.
Wang et al., "Detecting and Leveraging Finger Orientation for Interaction with Direct-Touch Surfaces", ACM, Oct. 4-7, 2009, pp. 23-32.
Wilson, Andrew D., "TouchLight: An Imaging Touch Screen and Display for Gesture-Based Interaction", ACM, Oct. 13-15, 2004, 8 pages.

(56) References Cited

OTHER PUBLICATIONS

Wu et al., "Gesture Registration, Relaxation, and Reuse for Multi-Point Direct-Touch Surfaces", In First IEEE International Workshop on Horizontal Interactive Human-Computer Systems, Jan. 5, 2006, 8 pages.
*Apple Inc.* vs. *Samsung Electronics Co. Ltd.*, Judgment in Interlocutory proceeding, Case No. 396957/KG ZA 11-730, civil law sector, Aug. 24, 2011, pp. 1-65.
*Apple Inc.* vs. *Samsung Electronics Co. Ltd*, Samsung's Motion to Supplement Invalidity Contentions, Case No. 11-cv-01846-LHK, filed Jan. 27, 2012 together with Exhibit 6, Jan. 27, 2012, 47 pages.
*Apple Inc.* vs. *Samsung Electronics Co. Ltd*, Samsung's Patent Local Rule 3-3 and 3-4 Disclosures, Case No. 11-cv-01846-LHK, dated Oct. 7, 2011, together with Exhibits G-1 through G-7 and Exhibit H, Oct. 7, 2011, 287 pages.
HTC Europe Co. Ltd and Apple Inc. Invalidity Claim, Dated Apr. 5, 2012, together with annexes, 12 pages.
HTC Europe Co. Ltd and Apple Inc. invalidity Claim dated Jul. 29, 2011, together with amended Particulars of Claim and amended Grounds of Invalidity, 22 pages.
Motorola Mobility Opposition Grounds to Apple Inc. European Patent EP 2126678 dated Apr. 11, 2012, together with Exhibits E3, E4, and E5 re: CHT 2005, Apr. 2-7, 2005, Portland Oregon, USA, 53 pages.
Pleading notes Mr B.J. Berghuis van Woortman, in matter of *Apple Inc.* vs. *Samsung Electronics*, Case No. KG ZA 11-730 and KG ZA 11-731, Aug. 10-11, 2010, pp. 1-16.
Pleading notes Mr Kleemans, Mr Blomme and Mr Van Oorschot, in matter of *Apple Inc.* vs. *Samsung Electronics*, Case No. KG ZA 11-730 and KG ZA 11-731, Aug. 10, 2011, 35 pages.
*Samsung Electronics GmbH* vs *Apple Inc.*, "List scrolling and document translation, scaling and rotation on a touch-screen display", Opposition, Jan. 30, 2012, 27 pages.
*Samsung Electronics* vs *Apple Inc.*, Statement of Defense Also Counterclaim, Case No. KG ZA 2011-730, Jul. 20, 2011, 44 pages.
*Samsung Electronics* vs *Apple Inc.*, Statement of Defense Also Counterclaim, Case No. KG ZA 2011-731, Jul. 20, 2011, 48 pages.
International Preliminary Report on Patentability received for PCT Patent Application No. PCT/US2011/029957, mailed on Oct. 11, 2012, 8 pages.
International Preliminary Report on Patentability received for PCT Patent Application No. PCT/US2013/037423, issued on Dec. 31, 2014, 7 pages.
International Search Report and Written Opinion received for PCT Patent Application No. PCT/US2013/037423, mailed on Jul. 24, 2013, 11 pages.
Office Action received for Korean Patent Application No. 10-2012-7020604, mailed on Oct. 11, 2013, 4 pages (1 page of English Translation and 3 pages of Official Copy).
Office Action received for Korean Patent Application No. 10-2012-7030352, mailed on Dec. 9, 2013, 7 pages (3 pages of English Translation and 4 pages of Official Copy).
Office Action received for Korean Patent Application No. 10-2012-7030352, mailed on Feb. 23, 2015, 4 pages (See Communication under 37 CFR § 1.98(a) (3)).
Office Action received for Korean Patent Application No. 10-2012-7030352, mailed on Oct. 24, 2014, 3 pages (See Communication under 37 CFR § 1.98(a) (3)).
Notice of Allowance received for Korean Patent Application No. 10-2013-7013933, mailed on Feb. 26, 2015, 2 pages (See Communication under 37 CFR § 1.98(a) (3)).
Office Action Received for Korean Patent Application No. 10-2013-7013933, mailed on Mar. 26, 2014, 6 pages (3 pages of English Translation and 3 pages of Official Copy).
Notice of Allowance received for Korean Patent Application No. 10-2013-7014110, mailed on Jan. 28, 2015, 2 pages (See Communication under 37 CFR § 1.98(a) (3)).
Office Action received for Korean Patent Application No. 10-2013-7014110, mailed on Mar. 26, 2014, 7 pages (3 pages of English Translation and 4 pages of Official Copy).
Office Action received for European Patent Application No. 11784558.6, mailed on Jun. 23, 2014, 5 pages.
Office Action received for European Patent Application No. 11784560.2, mailed on Jun. 23, 2014, 5 pages.
Office Action received for European Patent Application No. 11784562.8, mailed on Feb. 21, 2014, 5 pages.
Final Office Action received for U.S. Appl. No. 12/722,428, mailed on Aug. 16, 2012, 16 pages.
Final Office Action received for U.S. Appl. No. 12/752,003, mailed on Jun. 11, 2013, 40 pages.
Final Office Action received for U.S. Appl. No. 12/752,003, mailed on Sep. 26, 2014, 40 pages.
Non Final Office Action received for U.S. Appl. No. 12/752,003, mailed on Mar. 7, 2014, 64 pages.
Non-Final Office Action received for U.S. Appl. No. 12/752,003, mailed on Sep. 19, 2013, 49 pages.
Non-Final Office Action received for U.S. Appl. No. 12/794,625, mailed on Oct. 26, 2012, 7 pages.
Non-Final Office Action received for U.S. Appl. No. 13/076,391, mailed on Jul. 16, 2014, 11 pages.
Non-Final Office Action received for U.S. Appl. No. 13/076,391, mailed on Nov. 7, 2013, 12 pages.
Notice of Allowance received for U.S. Appl. No. 13/076,391, mailed on Jan. 29, 2015, 10 pages.
Notice of Allowance received for U.S. Appl. No. 13/076,392, mailed on Aug. 6, 2013, 6 pages.
Notice of Allowance received for U.S. Appl. No. 13/076,393, mailed on Oct. 3, 2013, 13 pages.
Non-Final Office Action received for U.S. Appl. No. 13/076,395, mailed on Jul. 17, 2014, 10 pages.
Non-Final Office Action received for U.S. Appl. No. 13/076,395, mailed on Oct. 23, 2013, 7 pages.
Notice of Allowance received for U.S. Appl. No. 13/076,395, mailed on Jan. 30, 2015, 8 pages.
Notice of Allowance received for U.S. Appl. No. 13/076,397, mailed on Nov. 26, 2013, 11 pages.
Notice of Allowance received for U.S. Appl. No. 13/076,397, mailed on Sep. 16, 2013, 10 pages.
Notice of Allowance received for U.S. Appl. No. 13/076,399, mailed on Oct. 10, 2013, 7 pages.
Notice of Allowance received for U.S. Appl. No. 13/076,401, mailed on Jul. 18, 2013, 6 pages.
Non-Final Office Action received for U.S. Appl. No. 13/076,407, mailed on Dec. 5, 2013, 16 pages.
Notice of Allowance received for U.S. Appl. No. 13/076,407, mailed on May 20, 2014, 9 pages.
Final Office Action received in U.S. Appl. No. 13/076,411, mailed on Nov. 15, 2013, 11 pages.
Final Office Action received for U.S. Appl. No. 13/076,414, mailed on Feb. 19, 2014, 10 pages.
Non-Final Office Action received for U.S. Appl. No. 13/076,414, mailed on Aug. 21, 2013, 8 pages.
Non Final Office Action received for U.S. Appl. No. 13/077,711, mailed on Apr. 25, 2014, 15 pages.
Notice of Allowance received for U.S. Appl. No. 13/077,711, mailed on Mar. 23, 2015, 8 pages.
Office Action received for Korean Patent Application No. 10-2012-7030352, mailed on Dec. 24, 2015, 5 pages (2 pages of English Translation and 3 pages of Official Copy).
Office Action Received for European Patent Application No. 11784562.8, mailed on Nov. 30, 2015, 6 pages.
Notice of Acceptance Received for Australian Patent Application No. 2011323375, mailed on Jan. 22, 2016, 3 pages.
Notice of Acceptance Received for Australian Patent Application No. 2011323301, mailed on Jan. 21, 2016, 3 pages.

* cited by examiner

APPARATUS AND METHOD FOR CONDITIONALLY ENABLING OR DISABLING SOFT BUTTONS

RELATED APPLICATIONS

This application is a continuation of U.S. application Ser. No. 12/788,283, filed on May 26, 2010, which is a continuation of PCT Patent Application No. PCT/US2010/020263, filed Jan. 6, 2010, which are hereby incorporated by reference in their entireties.

TECHNICAL FIELD

This relates generally to electronic devices with touch-sensitive surfaces, including but not limited to electronic devices with touch-sensitive displays that can conditionally activate or deactivate soft buttons on a displayed user interface, such as soft keys or other objects on a soft keyboard.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include entering characters using one or more soft keyboards. A user may need to perform such manipulations on user interface objects in any program or application where character input is needed.

But existing methods for using such keyboards are cumbersome and inefficient. For example, buttons for hiding the keyboard or switching to a different language keyboard can be unintentionally activated while typing on the keyboard, which makes the text entry experience tedious and creates a significant cognitive burden on a user. In addition, some conventional methods take longer than necessary to complete a task, thereby wasting a user's time and a device's power reserve, which can be particularly important consideration for battery-operated devices.

SUMMARY

Accordingly, there is a need for computing devices with faster, more efficient methods and interfaces for activating buttons on a soft keyboard. Such methods and interfaces may complement or replace conventional methods for activating buttons on a soft keyboard. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for computing devices with touch-sensitive displays (also known, for example, as "touch screens" or "touch screen displays") are reduced by the disclosed devices. In one example, a keyboard selection button in a soft keyboard is temporarily disabled in response to activation of certain other soft keyboard buttons (e.g., any of the letter buttons in the displayed soft keyboard), and is otherwise enabled for activation. By conditionally disabling the keyboard selection button, faster, more efficient typing by the user is enabled, and accidental activations of the keyboard selection button are avoided. Another example of a conditionally enabled button that facilitates faster and more efficient typing by the user is a keyboard hiding button. Typically, users do not want to hide a soft keyboard while actively typing, and therefore making the keyboard hiding button (whether displayed within a soft keyboard or elsewhere within a user interface on a touch-sensitive display) a conditionally enabled button facilitates faster and more efficient typing by the user, which in turn saves energy and a device's power reserve.

In accordance with some embodiments, a method is performed at a multifunction device with a touch screen display. The method includes displaying a soft keyboard having a plurality of buttons including a plurality of unconditionally enabled buttons and one or more conditionally enabled buttons, detecting a first input with a first button at a first time, and responding to detecting the first input by activating the first button. The method further includes detecting a second input with a second button at a second time, and responding to detection of the second input with the second button at the second time. When the first button and second button are both unconditionally enabled, the method activates the second button. However, when the first button is an unconditionally enabled button and the second button is a conditionally enabled button, the method conditionally disables the second button. In particular, when the period of time between the first time and the second time is above a predefined threshold, the method enables activation of the second button, and when the period of time between the first time and the second time is below the predefined threshold, the method disables activation of the second button.

In accordance with some embodiments, a method is performed at a multifunction device with a touch screen display. The method includes displaying a soft keyboard having a plurality of buttons including a plurality of unconditionally enabled buttons and one or more conditionally enabled buttons detecting a first input with a respective unconditionally enabled button at a first time, and responding to detection of the first input at the first time by activating the respective unconditionally enabled button, and disabling at least one of the conditionally enabled buttons for a predefined period of time commencing from the first time. The method further includes detecting a second input with a conditionally enabled button disabled in response to the first input, the second input being detected at a second time that is within the predefined period of time, and responding to detection of the second input at the second time by disregarding the second input.

In accordance with some embodiments, a multifunction device includes a touch screen display, one or more processors, memory, and one or more programs; the one or more programs are stored in the memory and configured to be executed by the one or more processors and the one or more programs include instructions for performing the operations of any of the methods described above. In accordance with some embodiments, a graphical user interface on a multifunction device with a touch screen display, a memory, and one or more processors to execute one or more programs stored in the memory includes one or more of the elements displayed in any of the methods described above, which are updated in response to inputs, as described in any of the methods above. In accordance with some embodiments, a computer readable storage medium has stored therein instructions which when executed by a multifunction device with a touch screen display, cause the device to perform the operations of any of the methods described above. In accordance with some embodiments, a multifunction device includes: a touch screen display; and means for performing the operations of any of the methods described above. In accordance with some embodiments, an information processing apparatus, for use in a multifunction device with a touch screen display, includes means for performing the operations of any of the methods described above.

Thus, multifunction devices with touch screen displays are provided with faster, more efficient methods and interfaces for activating keys, thereby increasing the effectiveness, efficiency, and user satisfaction with such devices. Such methods and interfaces may complement or replace conventional methods for activating keys.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
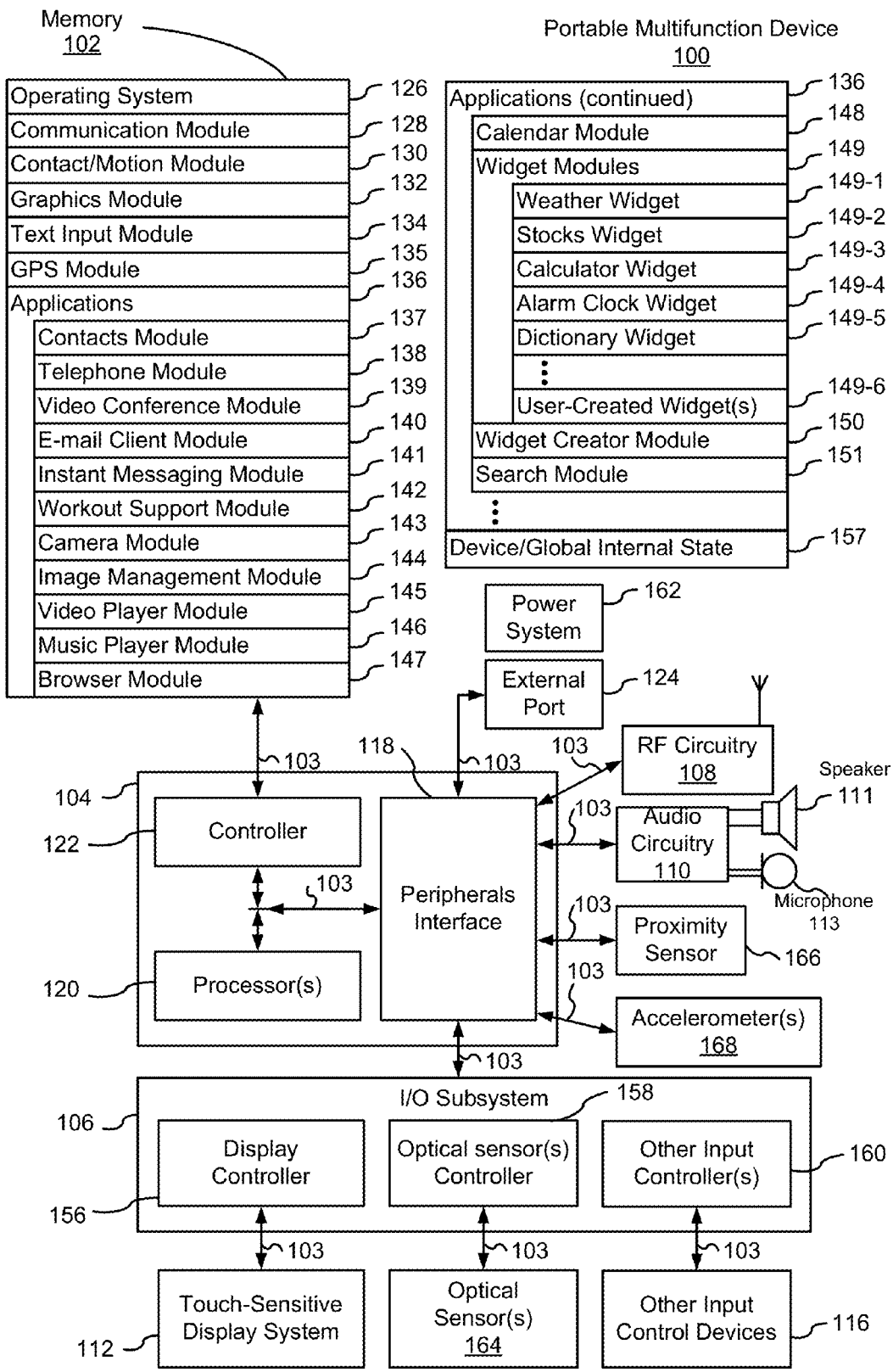
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device, such as a mobile telephone, that also contains other functions, such as PDA and/or music player functions. Exemplary embodiments of portable multifunction devices include, without limitation, the iPhone® and iPod Touch® devices from Apple Inc. of Cupertino, Calif. Other portable devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entireties. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
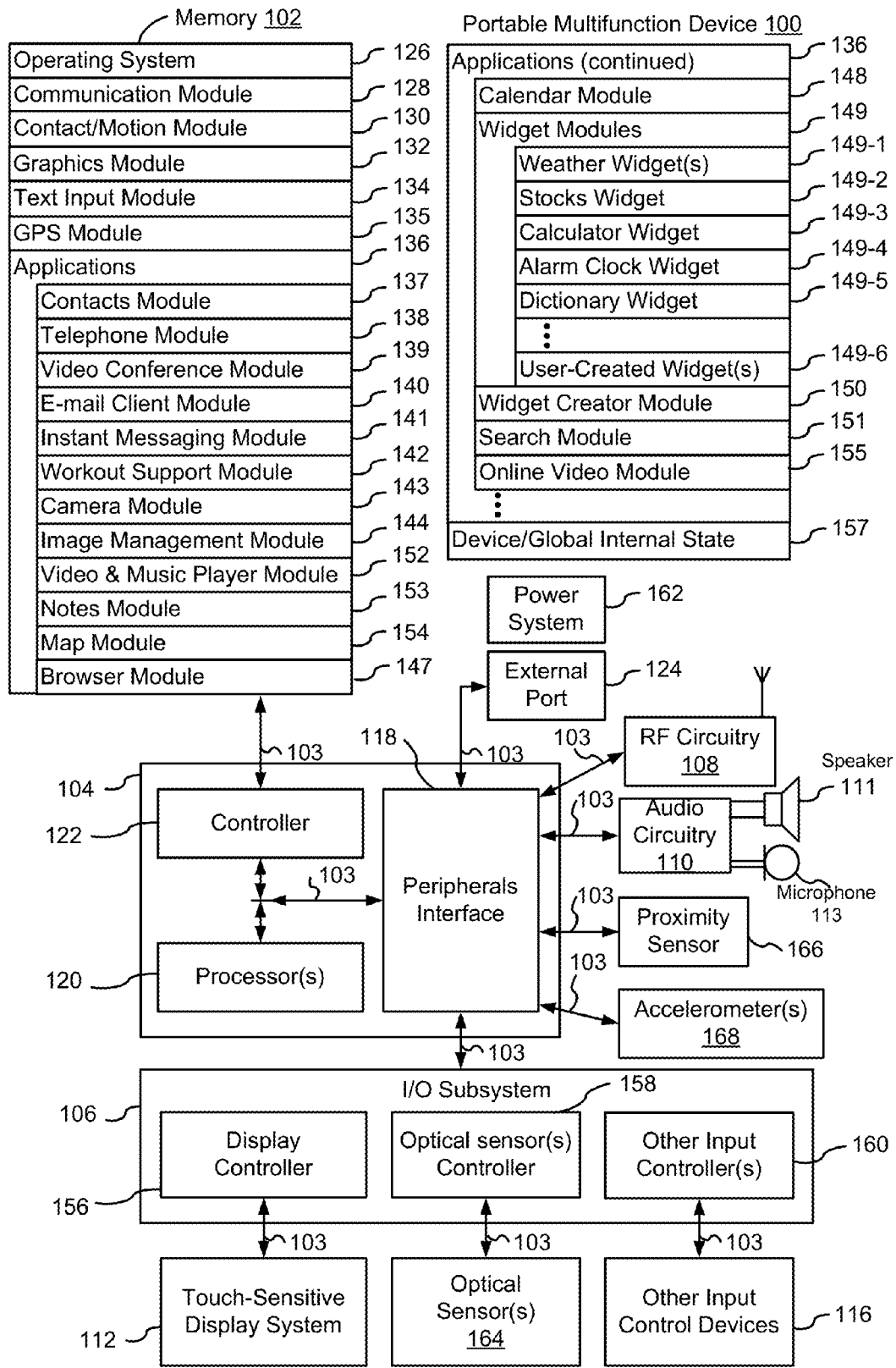

Attention is now directed toward embodiments of portable devices with touch-sensitive displays. FIGS. 1A and 1B are block diagrams illustrating portable multifunction devices 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2). A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from portable device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a resolution in excess of 100 dpi. In some embodiments, the touch screen has a resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

In some embodiments, device 100 may include a physical or virtual wheel (e.g., a click wheel) as input control device 116. A user may navigate among and interact with one or more graphical objects (e.g., icons) displayed in touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by input controller 160 as well as one or more of the modules and/or sets of instructions in memory 102. For a virtual click wheel, the click wheel and click wheel controller may be part of touch screen 112 and display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIGS. 1A and 1B show an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
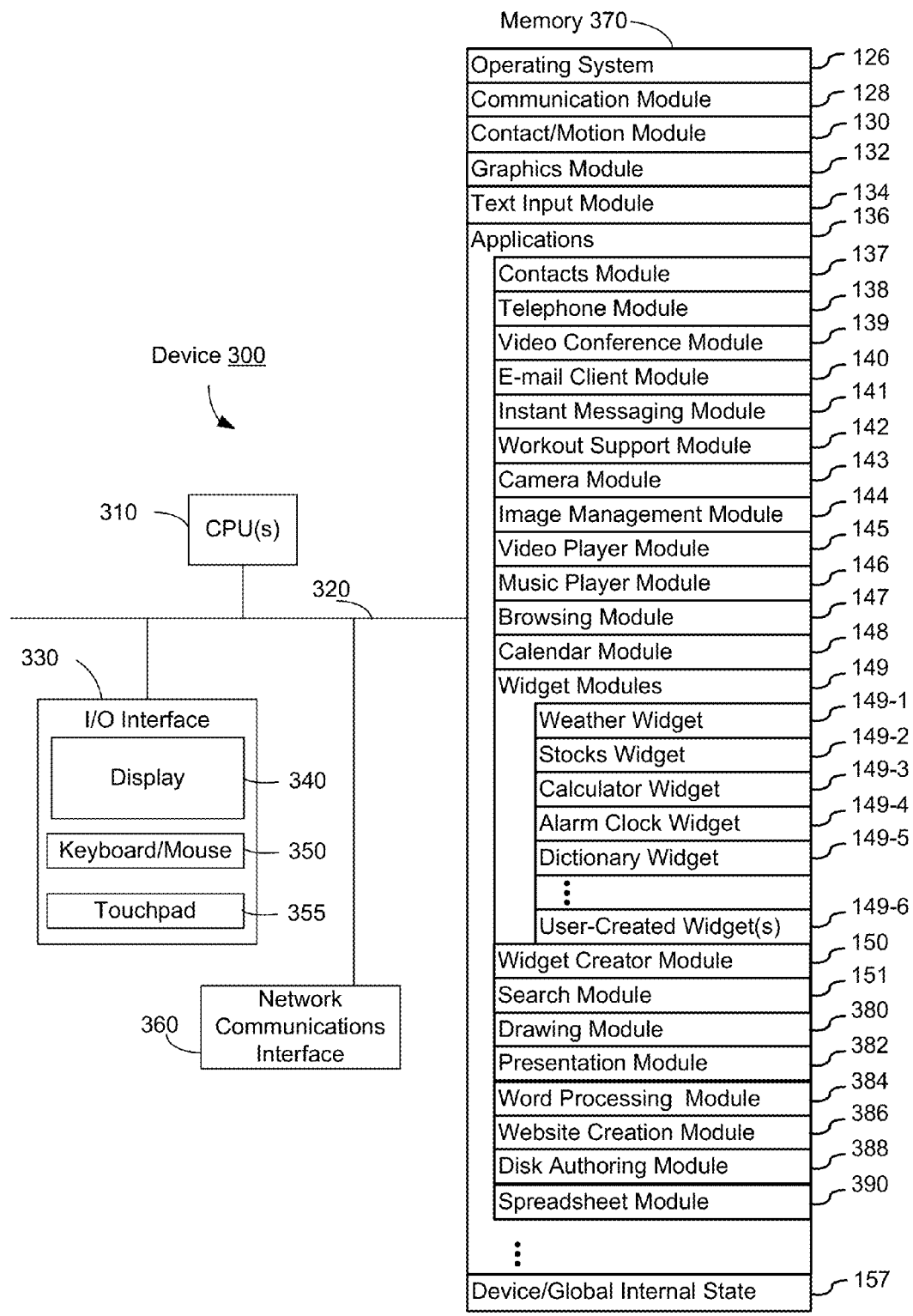
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detects contact on a touchpad. In some embodiments, contact/motion module 130 and controller 160 detects contact on a click wheel.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  video player module 145;
  music player module 146;
  browser module 147;
  calendar module 148;
  widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which merges video player module 145 and music player module 146;
  notes module 153;
  map module 154; and/or
  online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, video player module 145 includes executable instructions to display, present or otherwise play back videos (e.g., on touch screen 112 or on an external, connected display via external port 124).

In conjunction with touch screen 112, display system controller 156, contact module 130, graphics module 132, audio circuitry 110, speaker 111, RF circuitry 108, and browser module 147, music player module 146 includes executable instructions that allow the user to download and play back recorded music and other sound files stored in one or more file formats, such as MP3 or AAC files. In some embodiments, device 100 may include the functionality of an MP3 player, such as an iPod (trademark of Apple Inc.).

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1C:
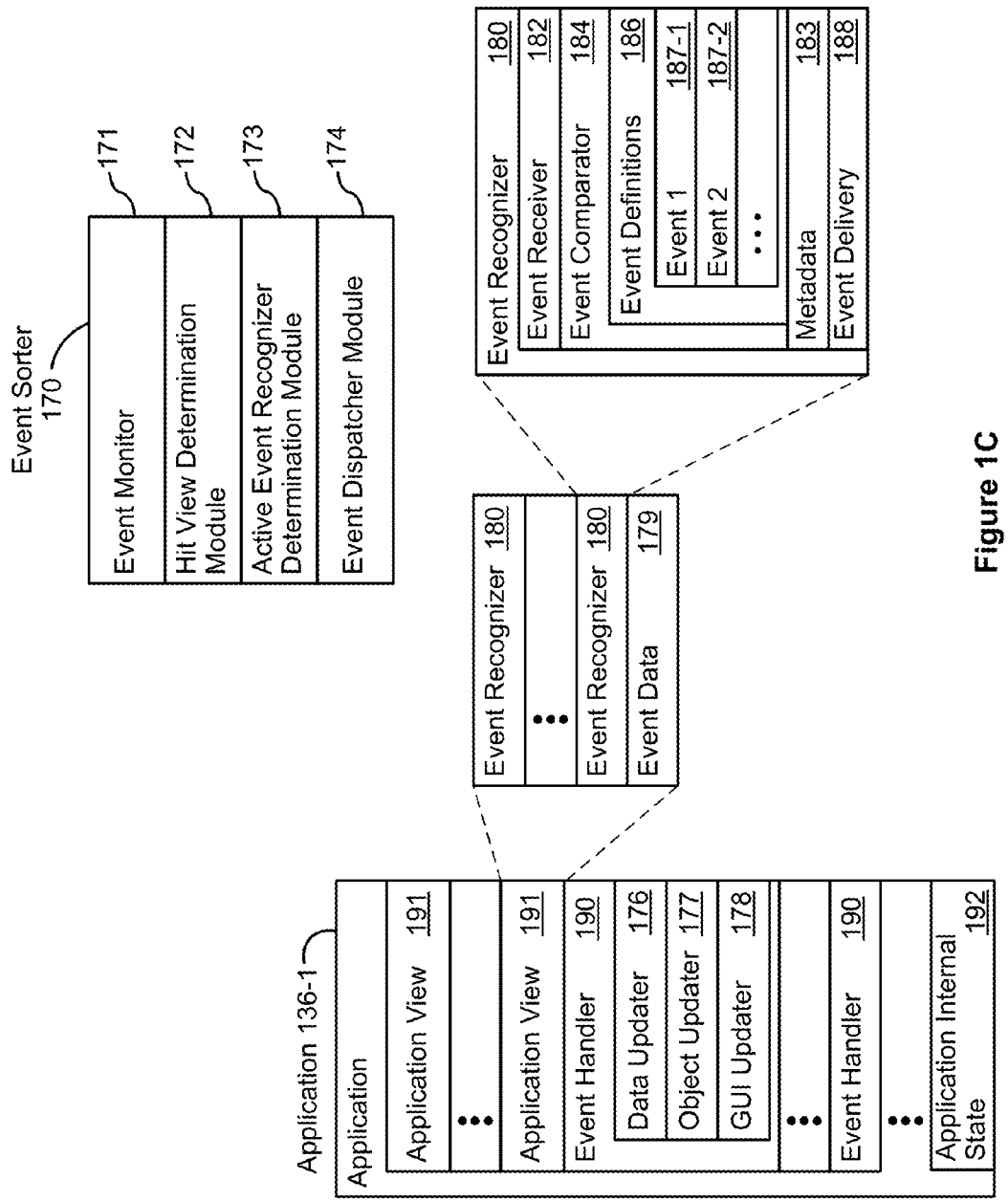
FIG. 1C is a block diagram illustrating exemplary components for event handling in accordance with some embodiments.

FIG. 1C is a block diagram illustrating exemplary components for event handling in accordance with some embodiments. In some embodiments, memory 102 (in FIGS. 1A and 1B) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
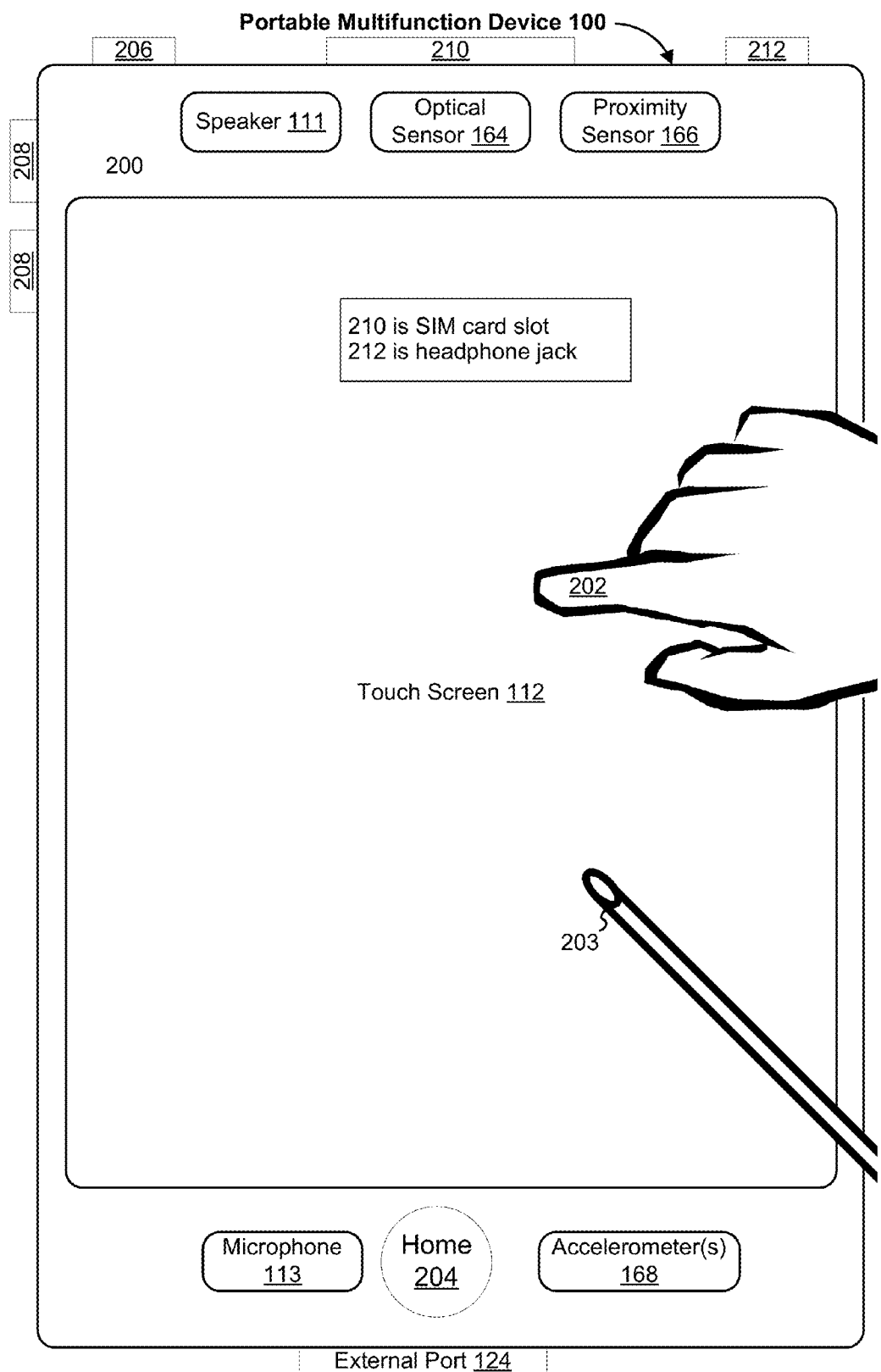
FIG. 2 illustrates a portable multifunction device having a touch-sensitive display in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
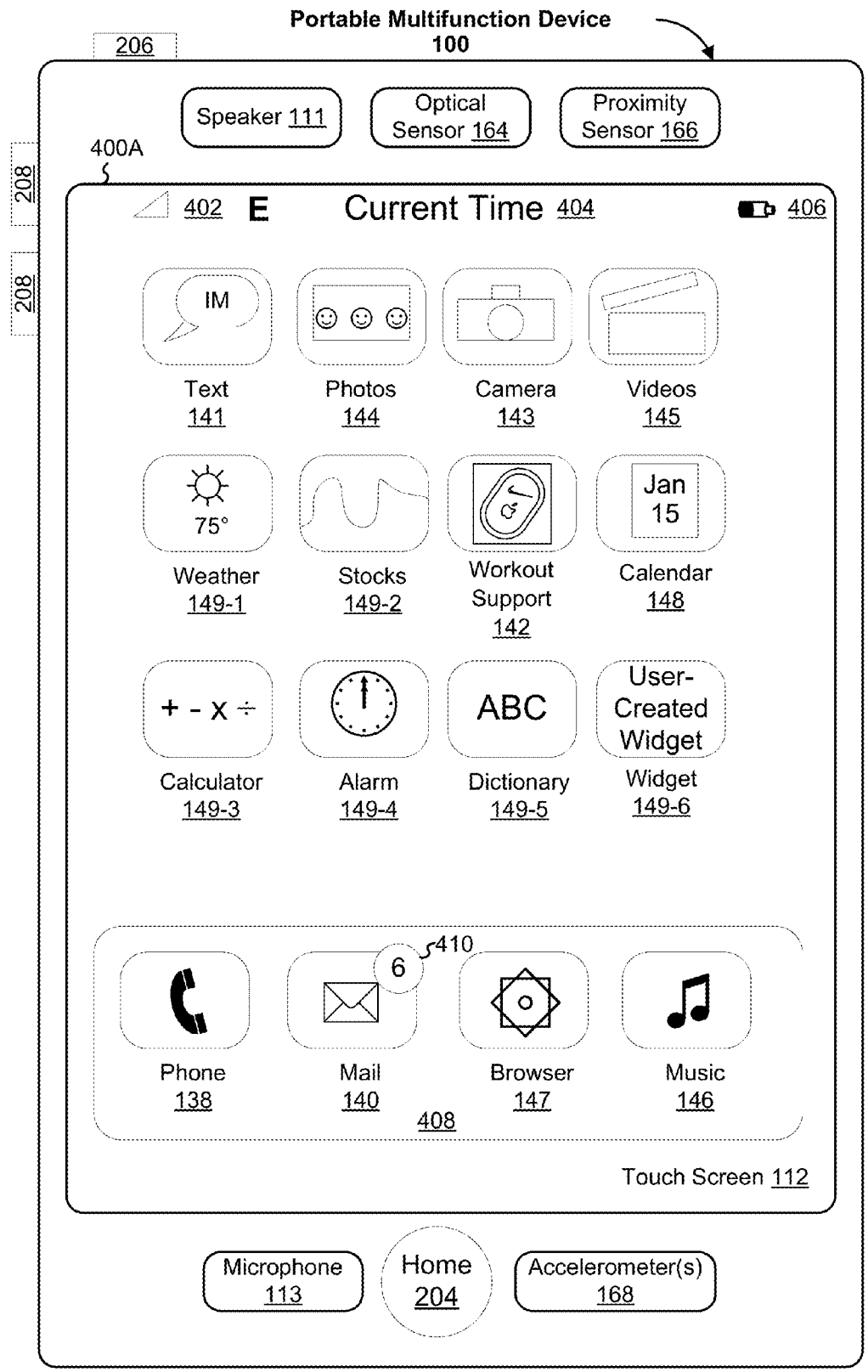
FIGS. 4A and 4B illustrate exemplary user interfaces for a menu of applications on a portable multifunction device in accordance with some embodiments.
Figure 4B:
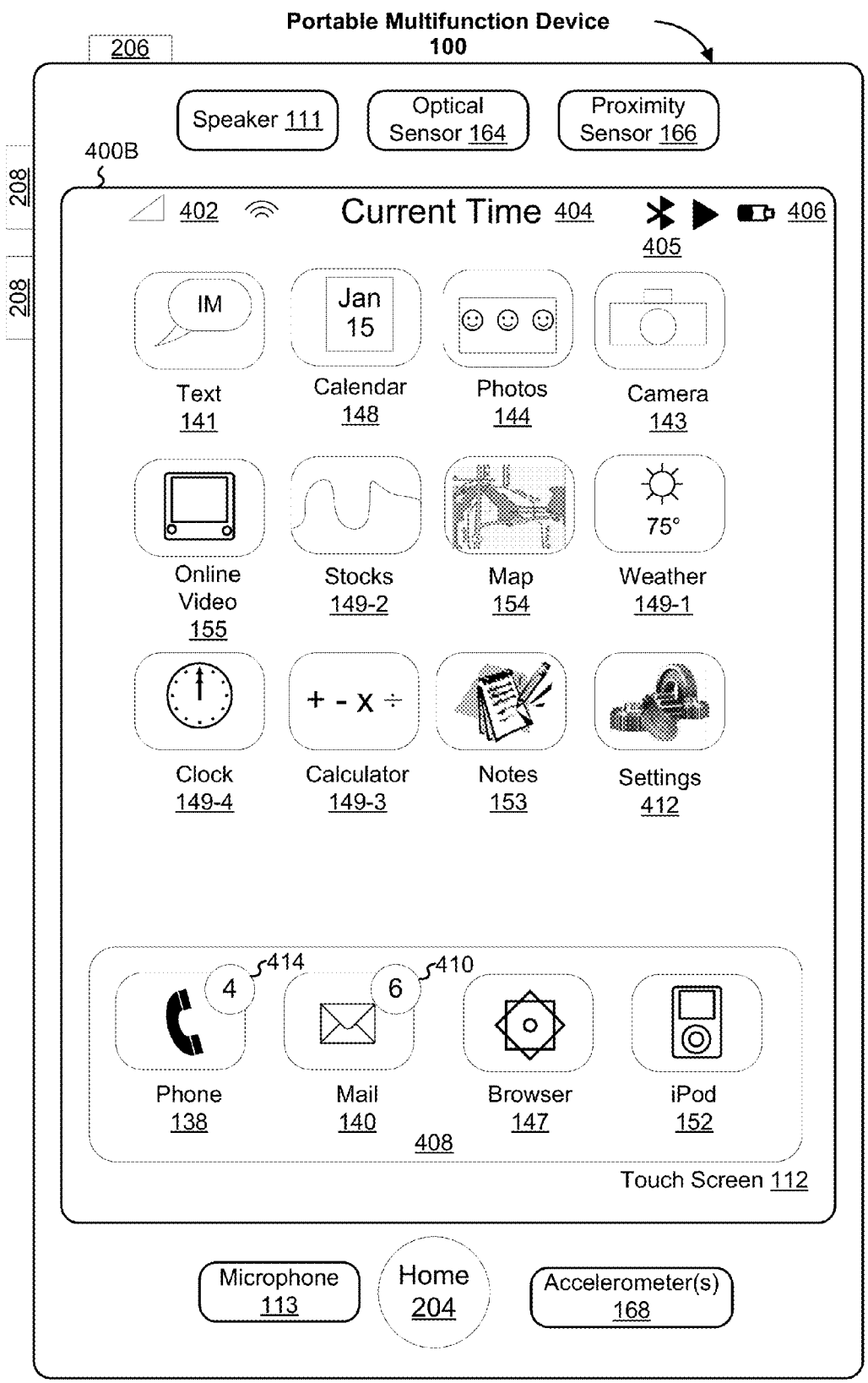

FIGS. 4A and 4B illustrate exemplary user interfaces for a menu of applications on portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Music player 146; and
Icons for other applications, such as:
  IM 141;
  Image management 144;
  Camera 143;
  Video player 145;
  Weather 149-1;
  Stocks 149-2;
  Workout support 142;
  Calendar 148;

Calculator 149-3;

Alarm clock 149-4;

Dictionary 149-5; and

User-created widget 149-6.

In some embodiments, user interface 400B includes the following elements, or a subset or superset thereof:

402, 404, 405, 406, 141, 148, 144, 143, 149-3, 149-2, 149-1, 149-4, 410, 414, 138, 140, and 147, as described above;

Map 154;

Notes 153;

Settings 412, which provides access to settings for device 100 and its various applications 136, as described further below;

Video and music player module 152, also referred to as iPod (trademark of Apple Inc.) module 152; and Online video module 155, also referred to as YouTube (trademark of Google Inc.) module 155.

In the descriptions provided below, the term "contact" (except when used to describe an entry in a contact list, address book or the like) is used as a short hand term for "touch gesture," and thus each contact mentioned or described below may be any suitable touch gesture detected by a sensor (or set of sensors) of a touch-sensitive display or other touch-sensitive surface. Furthermore, in some embodiments, "touch gestures" include not only gestures, made by one or more fingers or one or more styluses, that make physical contact a touch-sensitive screen 112 or other touch-sensitive surface, but also gestures that occur, in whole or in part, sufficiently close to touch-sensitive screen 112 or other touch-sensitive surface that the one or more sensors of touch-sensitive screen 112 or other touch-sensitive surface are able to detect those gestures.

The term "conditionally enabled" button means a button, key or object displayed on a soft keyboard or user interface that can be activated when enabled and that cannot be activated when disabled. The term "conditionally enabled button" is logically equivalent to "conditionally disabled button" because whether the button in enabled or disabled is conditional.

Activation of a soft button or other user interface object in response to a user-initiated touch gesture, at a location associated with the soft button or object, may occur upon a touch down event, a liftoff event, or any other detectable event associated with the user-initiated touch gesture. The term "activation" means an event that activates a button or a function associated with a button. For example, activation of a key on a soft keyboard is an event that adds a character corresponding to the key to a text buffer, or that performs a keyboard function such as: shifting a text entry mode from lowercase to uppercase characters, shifting one or more keys of the keyboard to represent alternative symbols or functions, replacing the current soft keyboard with a respective alternate keyboard, and so on.

Attention is now directed towards embodiments of user interfaces ("UI") and associated processes that may be implemented on a multifunction device with a display and a touch-sensitive surface, such as device 300 or portable multifunction device 100.

FIGS. 5A-5I illustrate exemplary interfaces for conditionally activating buttons or other displayed objects in accordance with some embodiments. The interfaces in these figures are used to illustrate the processes described below, including the processes in FIGS. 6A-6B and FIG. 7. Activation of a button or object results in performance of an action or function corresponding to the button or object; in some cases, the action or function performed depends both on the identity of the button or object that is activated and on the context in which the button or object is activated. A non-exhaustive set of examples of actions performed in response to activation of a respective button or object includes: adding a symbol (corresponding to the activated button or object) to a document or input text field, changing the displayed keyboard from a currently displayed keyboard to a keyboard corresponding to the activated button or object, launching or resuming execution or resuming display of an application or function corresponding to the activated button or object. As described below, in some cases activation of a button or object results in performance of both a primary function (e.g., inserting a letter or symbol in an input text field) and a secondary function (e.g., temporarily enabling or disabling activation of one or more buttons or objects displayed in the user interface, or temporarily enabling or disabling the performance of a function that is related to the primary function).

In FIGS. 5A-5I, some finger contact movement sizes may be exaggerated for illustrative purposes. No depiction in the figures bearing on finger contact movements should be taken as a requirement or limitation for the purpose of understanding sizes and scale associated with the methods and devices disclosed herein.

UI 500A (FIG. 5A) depicts an exemplary text input user interface (e.g., for notes module 153, email client module 140, etc.) on touch screen 112 of device 100. In this example, UI 500A includes a text entry region 502 and a QWERTY soft keyboard 504. Text entry region 502 may include input text 506 with text 506-1 and a cursor 508 at position 508-A. In some embodiments, soft keyboard 504 is associated with one or more languages. Soft keyboard 504 includes one or more soft buttons (or "soft keys") 510. Some of buttons 510 are associated with a respective letter. For example, button 510-A is associated with the letter "Q," button 510-B with the letter "W," button 510-C with the letter "E," and button 510-E with a new line or line break character. Some others of the buttons 510 are associated with particular text input functions or operations. For example, button 510-D is associated with the delete/backspace operation, and button 510-F with the shift function (for modifying the character input of other buttons 510, for example).

Keyboard 504 also includes soft buttons (or "soft keys") 512 related to operation of the keyboard. For example, buttons 512 include a button 512-A for switching from QWERTY keyboard 504 to a keyboard of numbers and symbols, button 512-B for switching from keyboard 504 to a keyboard associated with a different language or switching to a different language for keyboard 504, and button 512-C for hiding keyboard 504. Thus, buttons 512 in this example are mode changing buttons, which change the mode of operation of the device, by changing the soft keyboard displayed or by removing the keyboard from display.

UI 500H (FIG. 5H) depicts another exemplary text input user interface (e.g., for notes module 153, email client module 140, etc.) on touch screen 112 of device 100. UI 500H includes text entry region 502 and a numbers and symbols soft keyboard 520. Text entry region 502 may include input text 506 with text 506-1 and a cursor 508 at position 508-A. In some embodiments, keyboard 520 is associated with one or more languages. Soft keyboard 520 includes one or more soft buttons (or "soft keys") 522. Some of buttons 522 are associated with respective numbers or symbols. For example, button 522-A is associated with the numeral "1," button 522-B with the numeral "2," and button 522-C with the question mark symbol ("?"). Some of the other buttons 522 are associated with particular text input functions or operations. For example, buttons 522-D, 522-E, and 522-F have the same functionality as buttons 510-D, 510-E, and 510-F, respectively. Keyboard 522 also includes a button 512-D for switching to an alphabet/letters keyboard, as well as buttons 512-B and 512-C.

In some embodiments, buttons 510 or 522 are unconditionally enabled buttons and buttons 512 are conditionally enabled buttons. Conditionally enabled buttons 512 have particular conditions on their activation, while unconditionally enabled buttons 510 or 522 are not subject to those conditions. Or, in some embodiments, buttons 512 are disabled under particular conditions, while buttons 510 or 522 are not disabled under those particular conditions. An example of a conditionally enabled button is a keyboard selection button for activating a second keyboard (e.g., a keyboard having numeric keys and other symbols, at least some of which are not displayed by a first keyboard that includes the keyboard selection button). In this example the keyboard selection button is conditionally enabled because it is temporarily disabled in response to activation of certain other soft keyboard buttons (e.g., any of the letter buttons in the displayed soft keyboard), and is otherwise enabled for activation.

In some embodiments, a condition to activation of a respective conditionally enabled button 512 is whether a contact on a location corresponding to the respective button 512 is detected within a predefined period (i.e., a time window of a predefined amount of time) commencing from detection of a contact on a location corresponding to another button on keyboard 504 or 520; activation of button 512 is disabled during the time window. In some embodiments, the time window starts from a detection of contact on any button on the keyboard 504 or 520, including buttons 510, 522, 512. In some other embodiments, the time window starts from a detection of contact on a button 510 or 520, but not on a button 512. As discussed below, the time window has a predefined duration, i.e., lasts for a predefined amount of time, which is fixed (i.e., invariant) in some embodiments, and in other embodiments is variable or context dependent.

UI 500B (FIG. 5B) illustrates contact 514 on touch screen 112. In this example, contact 514 is at a location 514-A on touch screen 112 corresponding to the location of button 510-C, which also corresponds to the activation region of button 510-C. In response to detection of contact 514 at location 514-A, a character "e" 516 is inserted into input text 506, changing text 506-1 to text 506-2, and advancing cursor 508 to position 508-B.

The detection of contact 514 at location 514-A corresponding to the location of button 510-C also starts a time window of a predefined amount of time, during which contacts detected at locations on touch screen 112 corresponding to the locations of one or more conditionally enabled buttons (e.g., buttons 512) of keyboard 504 are disregarded; those buttons are disabled during the time window. In some embodiments, the predefined duration of the time window is fixed (i.e., invariant), having a duration, for example, between 200 and 500 milliseconds; in another example the predefined duration of the time window is fixed at a value between 150 and 700 milliseconds; in yet another example the predefined duration of the time window is fixed at a value between 300 and 750 milliseconds. In other embodiments, the length of the time window depends on heuristics, user history or other relevant contextual information. In one example, the device measures the user's average delay between keystrokes, or between intra-word keystrokes, compares that value with a predefined average keystroke delay value, and adjusts the time window's length in accordance with the difference between (or the ratio of) the user's average keystroke delay and the predefined average. In another example, the time window length is different for one set of applications (e.g., notes and email applications) than for another application (or set of applications) (e.g., a browser application). The time window is sometimes called a mode change suppression time window, because keyboard mode changes are suppressed during the time window in accordance with some embodiments.

UI 500C (FIG. 5C) illustrates contact 518 on touch screen 112 directly following contact 514. UI 500C shows three (of many) possible locations on keyboard 504 at which contact 518 can be made and detected. In this example, the contact 518 can be detected at location 518-A, 518-B, or 518-C on touch screen 112. The following figures illustrate the effect of the contact 518 being detected at a respective location 518-A, 518-B, or 518-C following contact 514.

UI 500D (FIG. 5D) illustrates contact 518 on touch screen 112 directly following contact 514. In this example, contact 518 is at a location 518-A on touch screen 112 corresponding to the location of button 510-B, which also corresponds to the activation region of button 510-B. In response to detection of contact 518 at location 518-A, a character "w" 520 is inserted into input text 506, changing text 506-2 to text 506-3, and cursor 508 is moved to position 508-C. Button 510-B is an unconditionally enabled button that is not affected by the time window from contact 514; the character insertion and cursor movement occurs whether contact 518 detected at location 518-A occurs inside or outside of the time window from contact 514.

Further, detection of contact 518 at location 518-A begins a new time window having the predefined amount of time. In effect, the time window is shifted or otherwise varied so that it starts from the detection of contact 518 or is adjusted accordingly.

UI 500E (FIG. 5E) illustrates a contact 518 on touch screen 112 directly following contact 514. In this example, contact 518 is at a location 518-B on touch screen 112 corresponding to the location of button 510-D, which also corresponds to an activation region of button 510-D. In response to detection of contact 518 at location 518-B, the character "e" 516 in text 506-2 is deleted, reverting text 506-2 back to text 506-1, and cursor 508 is moved to position 508-A. Button 510-D is an unconditionally enabled button that is not affected by the time window triggered by contact 514; the character deletion and cursor movement occurs whether contact 518 detected at location 518-B occurs inside or outside of the time window from contact 514. Further, detection of contact 518 at location 518-B begins a new time window. As explained above, the time window has a predefined duration, which is fixed (i.e., invariant) in some embodiments and is variable or context-dependent in other embodiments.

UI 500F (FIG. 5F) illustrates a contact 518 on touch screen 112 directly following contact 514. In this example, contact 518 is at location 518-C on touch screen 112 corresponding to the location of button 512-C, which also corresponds to the activation region of button 512-C. Button 512-C is a conditionally enabled button that is affected by the time window from contact 514. Depending on when contact 518 was made (and thus when contact 518 was detected), either keyboard 504 is hidden or nothing happens in response to detection of contact 518 at location 518-C. If contact 518 is detected at location 518-C at a time within the time window, keyboard 504 is not hidden, and UI 500F continues to be displayed; contact 518 is disregarded. If contact 518 is detected at location 518-C at a time after the time window, keyboard 504 is hidden, as illustrated in UI 500G (FIG. 5G).

Timeline 550 (not drawn to scale) (FIG. 5I) depicts times at which the contacts described above may be detected and illustrate the time windows started by the detected contacts. Timeline 550 depicts time 552 at which a contact is detected, and times 554, 556, and 558 at which subsequent contacts may be detected (assuming, for example, that no contacts are detected before time 552 within the time window length of time 552). A contact detected at time 552, at a location corresponding to button 510 (e.g., contact 514 at location 514-A) or 522 (or in some embodiments, any button on soft keyboard 504 or 522, including a button 512), starts time window 560-A of a duration commencing from time 552. The button corresponding to the location of the contact detected at time 552 is activated. If a contact is detected at time 554 and that contact is at a location corresponding to a button 510 or 522 (e.g., contact 514 at location 514-A, corresponding to button 510-C), then the corresponding button is activated (e.g., button 510-C is activated); activation of buttons 510 or 520 are not affected by the time windows. If a contact is detected at time 554 and that contact is at a location corresponding to a conditionally enabled button (e.g., contact 518 at location 518-C, corresponding to button 512-C), then the activation of the corresponding button is prevented (e.g., activation of button 512-C is prevented); the conditionally enabled button is disabled during time window 560-A. On the other hand, if a contact at a location corresponding to a conditionally enabled button is detected at time 558, which is outside of time window 560-A, without any intervening contacts detected between times 552 and 558, then the corresponding conditionally enabled button is activated.

A contact on button 510 or 522 detected at time 554, directly following the contact detected at time 552 described above, starts a time window 560-B, which can have the same length as time window 560-A. If the contact directly following the contact detected at time 554 is a contact at a location corresponding to a conditionally enabled button, and the contact is detected at time 556, then activation of the conditionally enabled button is prevented. The activation is prevented because even though time 556 is outside of time window 560-A, time 556 is within time window 560-B. If the contact is detected instead at time 558, then the corresponding conditionally enabled button is activated because time 558 is outside of time windows 560-A and 560-B.

Figure 6A:
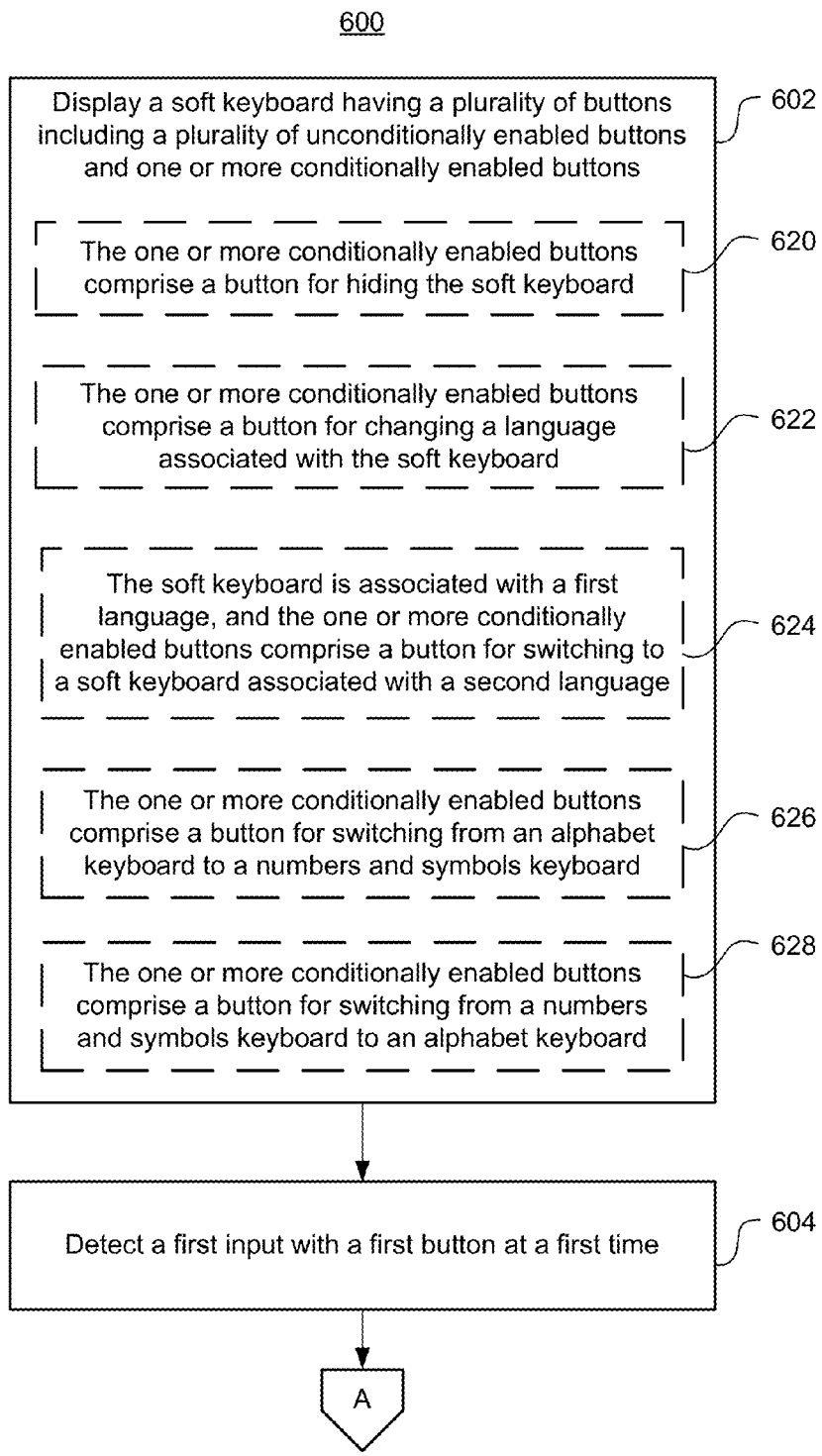
FIGS. 6A-6B are flow diagrams illustrating a method of activating buttons in accordance with some embodiments.
Figure 6B:
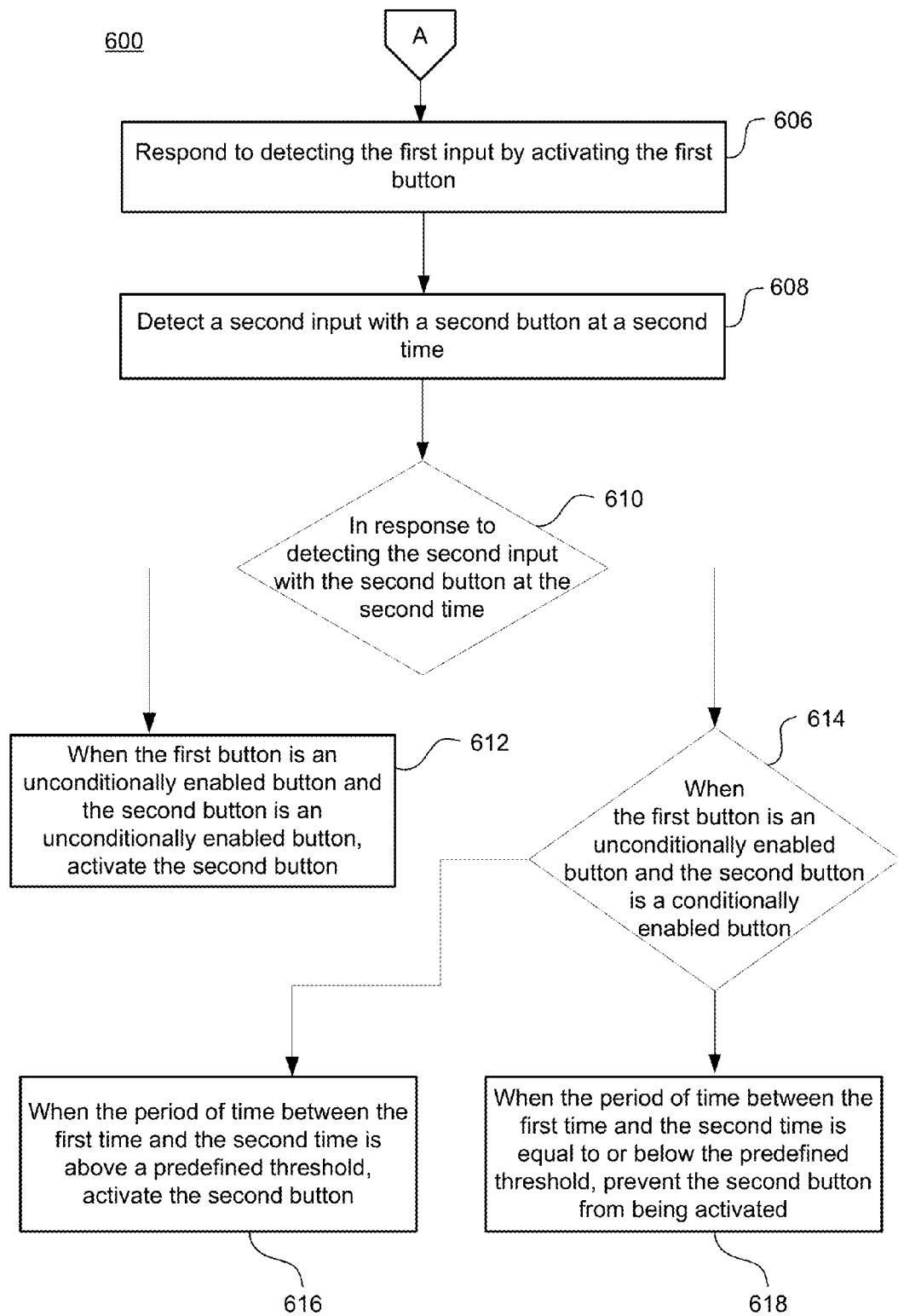

FIGS. 6A-6B are flow diagrams illustrating a method 600 of activating buttons in accordance with some embodiments. Method 600 is performed at a multifunction device (e.g., device 300, FIG. 3, or portable multifunction device 100, FIG. 1) with a display and a touch-sensitive surface. In some embodiments, the display is a touch-sensitive display and the touch-sensitive surface is on the display.

As described below, method 600 provides an intuitive way to activate buttons that reduces the cognitive burden on a user, thereby creating a more efficient human-machine interface. For battery-operated computing devices, enabling a user to activate buttons faster and more efficiently, while preventing inadvertent activations of mode-changing buttons or other conditionally enabled buttons, conserves power and increases the time between battery charges.

The device displays (602) a soft keyboard having a plurality of buttons including a plurality of unconditionally enabled buttons and one or more conditionally enabled buttons. For example, in FIG. 5A, keyboard 504 is displayed on touch screen 112. Keyboard 504 includes unconditionally enabled buttons 510 and buttons 512, one or more of which (e.g., button 512-C) are conditionally enabled buttons. As another example, in FIG. 5H, keyboard 520 is displayed on touch screen 112. Keyboard 520 includes unconditionally enabled buttons 522 and buttons 512, one or more of which are conditionally enabled buttons.

In some embodiments, the one or more conditionally enabled buttons include one or more of: a button for hiding the keyboard (e.g., button 512-C) (620); a button for changing a language associated with the soft keyboard (e.g., button 512-B) (622); where the soft keyboard is associated with a first language, a button for switching to a soft keyboard associated with a second language (e.g., button 512-B) (624); a button for switching from an alphabet keyboard to a numbers-and-symbols keyboard (e.g., button 512-A) (626); and a button for switching from a numbers-and-symbols keyboard to an alphabet keyboard (e.g., button 512-D) (628).

The device detects (604) a first input with a first button at a first time. For example, in FIG. 5B, contact 514 (the first input) is detected at time 552 (FIG. 5I) at location 514-A, which corresponds to button 510-C.

The device responds (606) to detecting the first input by activating the first button. For example, in FIG. 5B, the device responds to the detection of contact 514 at location 514-A by activating button 510-C. The effects of the activation include insertion of the character "e" 516 into input text 506 and movement of the cursor 508 to position 508-B.

After detecting and acting upon the activation of the first button, the device detects (608) a second input with a second button at a second time. For example, in FIG. 5C, the device detects contact 518 at a second time (time 554 or 556, FIG. 5I) after time 552. Different effects can occur depending on the location where contact 518 at the second time is detected (e.g., depending on which button is selected by contact 518) and whether the second time falls within the time window started by a prior button activation.

In response to detecting the second input with the second button at the second time (610), when the first button is an unconditionally enabled button and the second button is an unconditionally enabled button, the device activates (612) the second button. For example, in FIG. 5D, contact 518 is detected at location 518-A, which corresponds to unconditionally enabled button 510-B. Button 510-B is activated, and the effects of the activation include the insertion of a character "w" 520 into input text 506 and movement of cursor 508 to position 508-C. As another example, in FIG. 5E, contact 518 is instead detected at location 518-B, which corresponds to unconditionally enabled button 510-D. Button 510-D is activated, and the effects of the activation include the deletion of the character "e" 516 from input text 506 and movement of the cursor 508 to position 508-A.

In response to detecting the second input with the second button at the second time (610), when the first button is an unconditionally enabled button and the second button is a conditionally enabled button (614), whether the second button is activated depends on the period of time between the first time, when contact 514 is detected, and the second time, when contact 518 is detected. When the period of time between the first time and the second time is above a predefined threshold (which is a fixed value in some embodiments, and is a variable or context-dependent value in other embodiments), the device activates (616) the second button. When the period of time between the first time and the second time is equal to or below the predefined threshold (i.e., the second contact occurs within a mode change suppression time window), the device prevents (618) the second button from being activated.

Figure 5A:
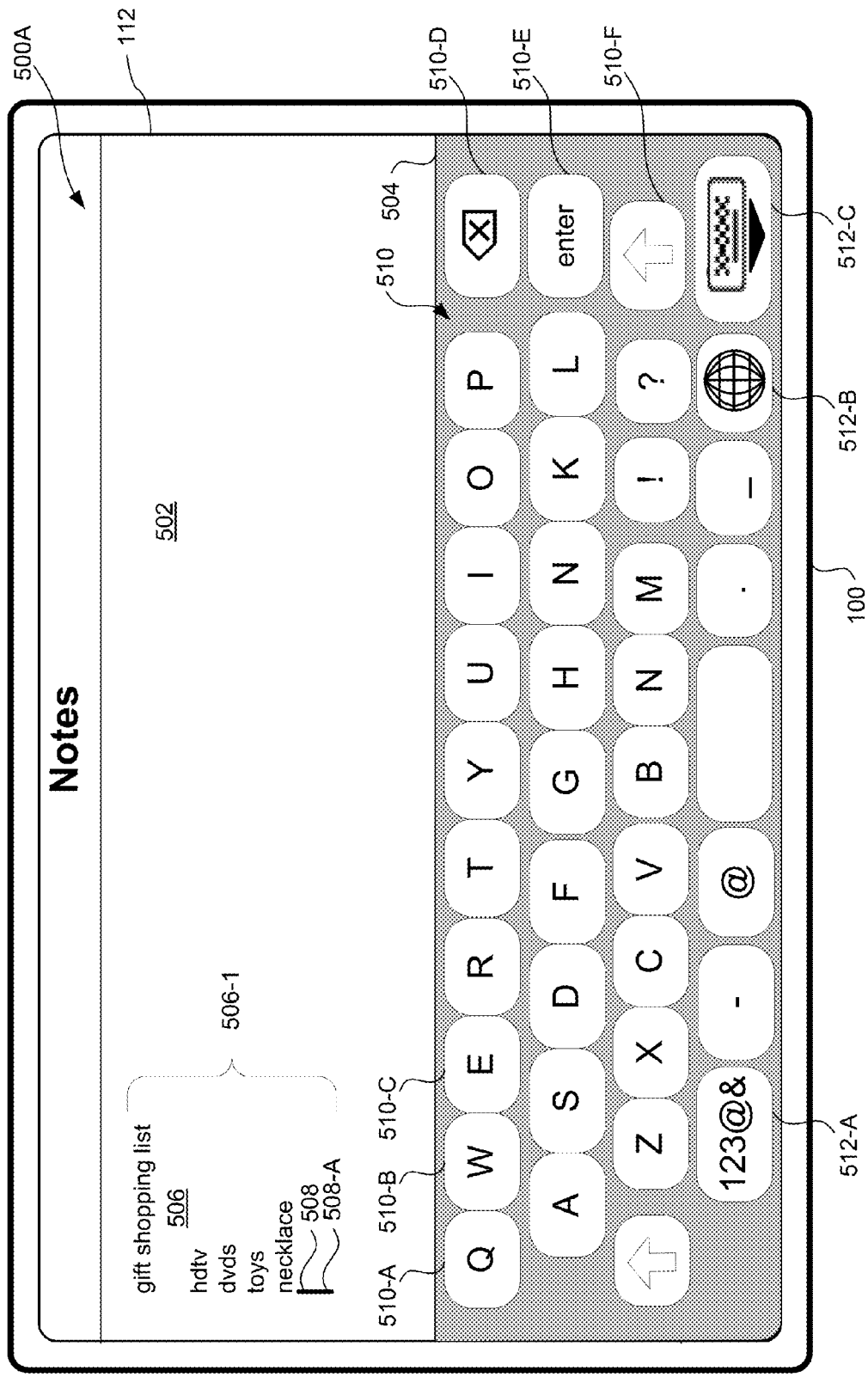
FIGS. 5A-5I illustrate exemplary user interfaces for activating buttons in accordance with some embodiments.
Figure 5B:
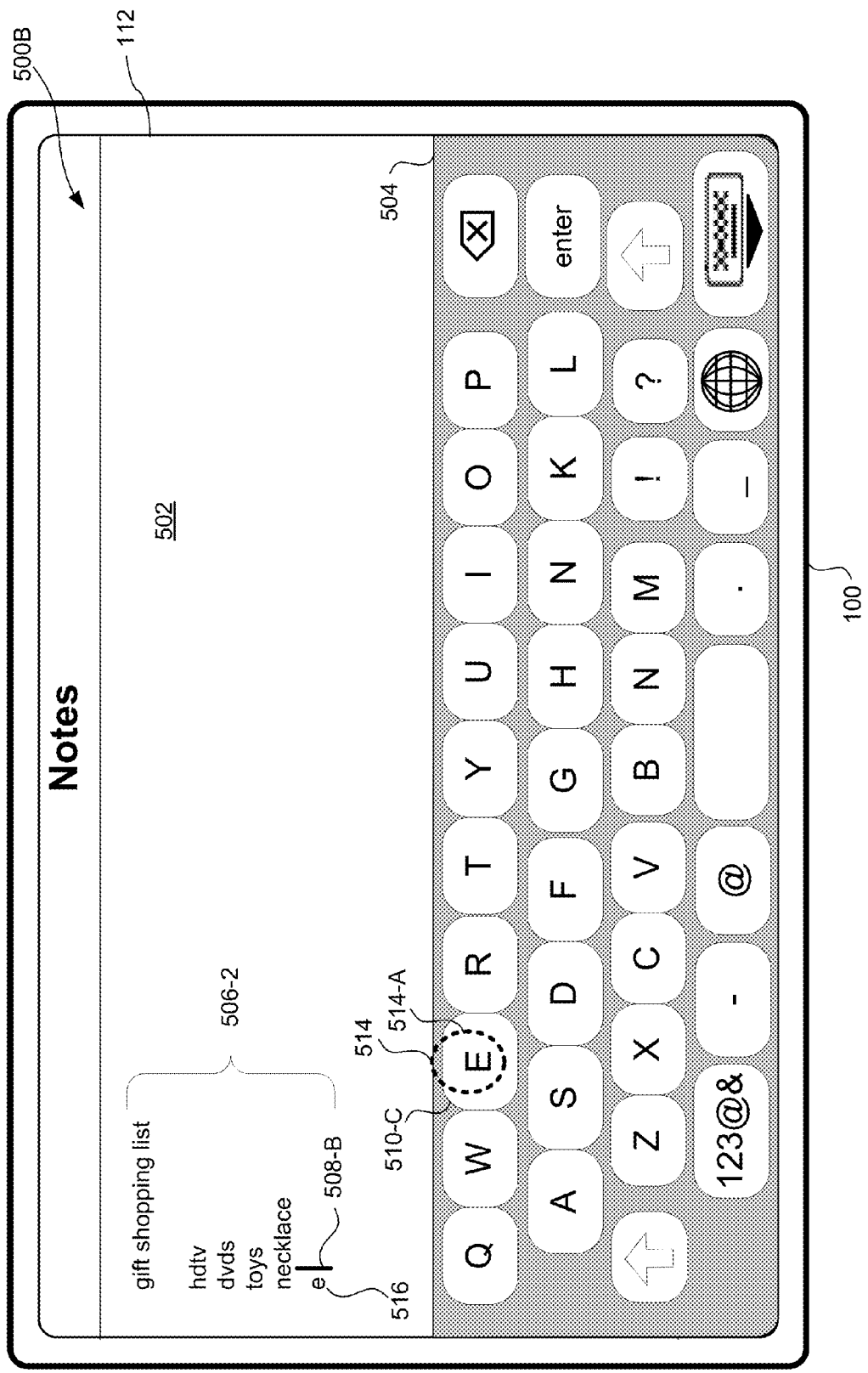
Figure 5C:
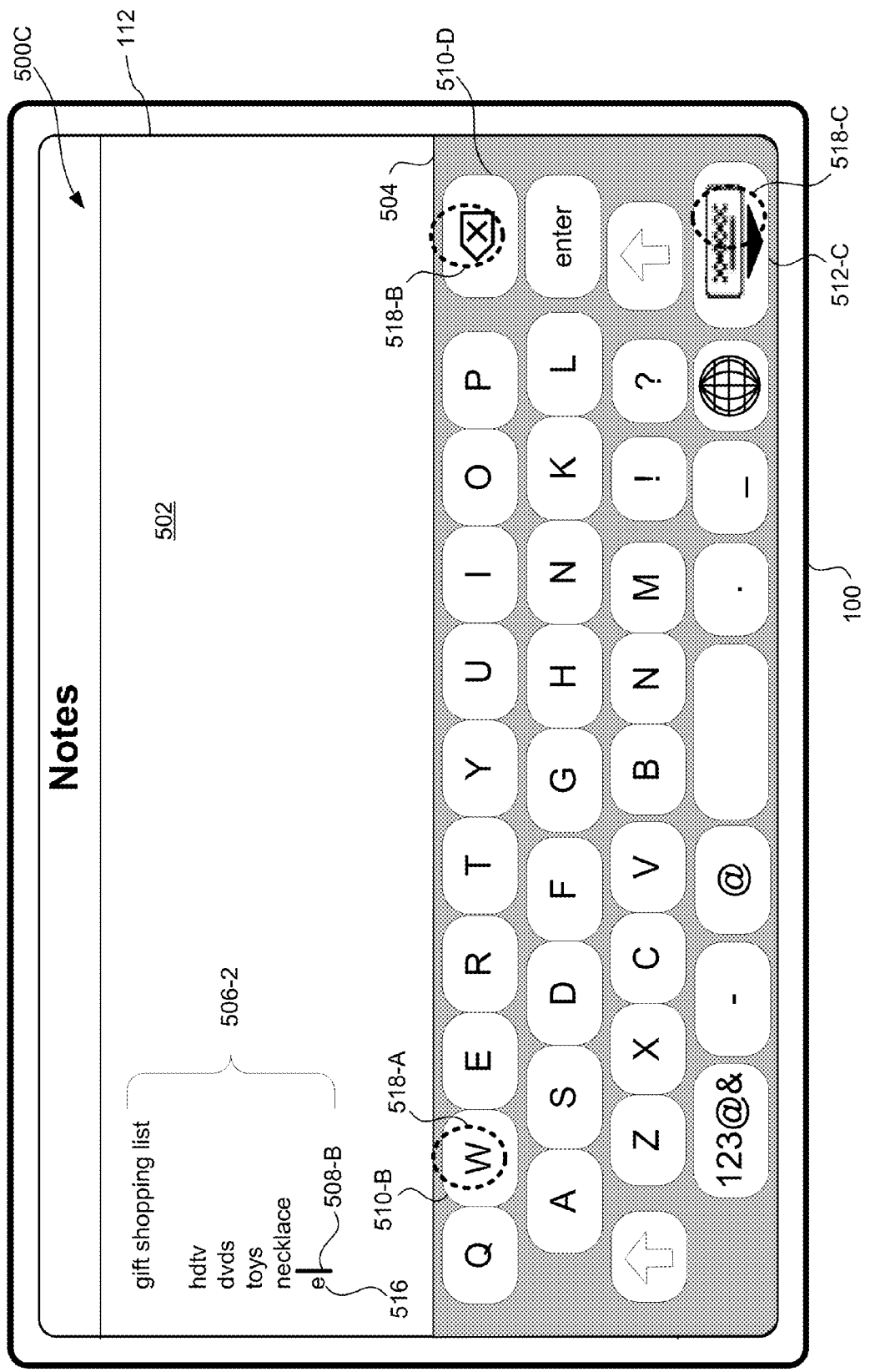
Figure 5D:
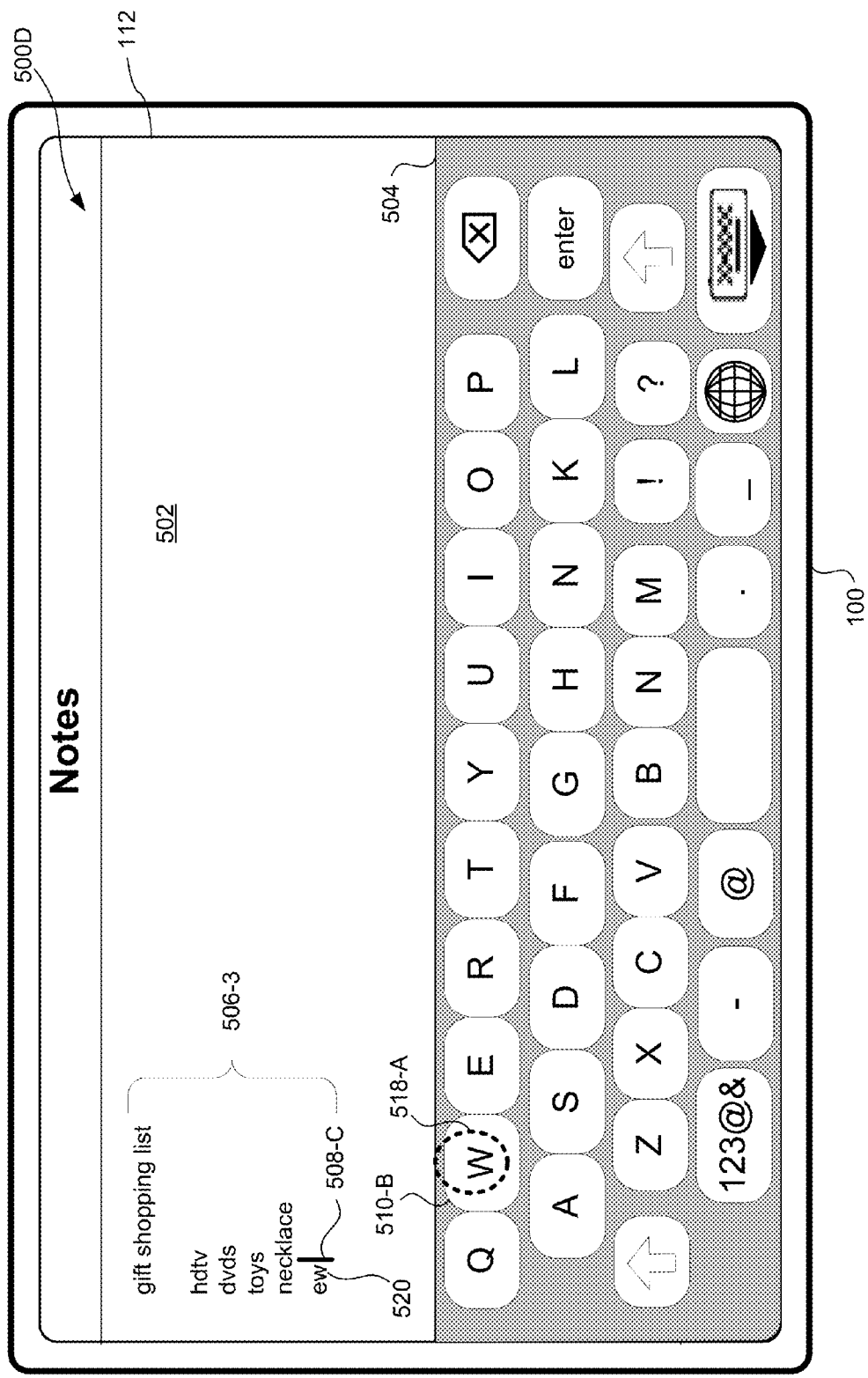
Figure 5E:
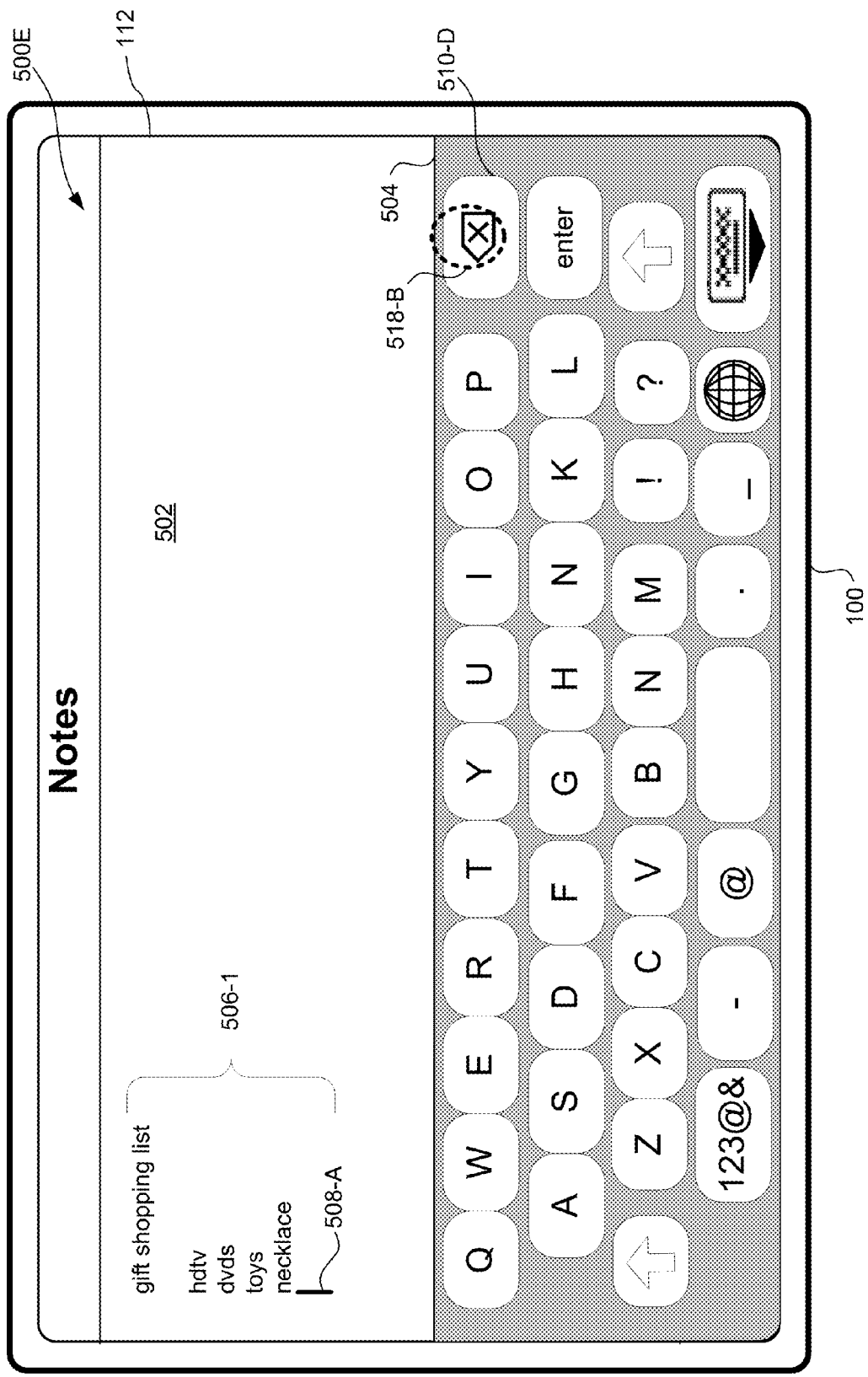
Figure 5F:
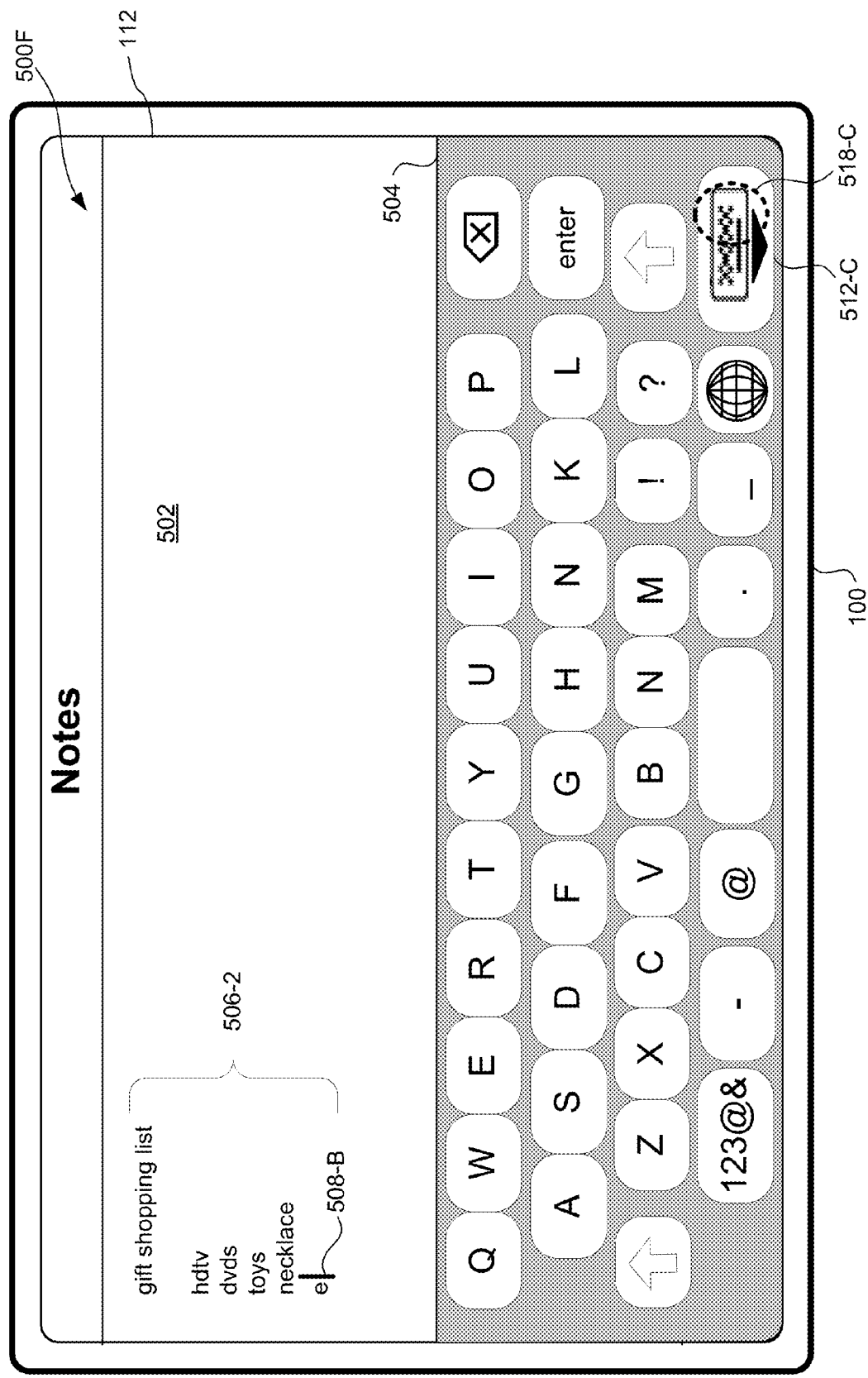
Figure 5G:
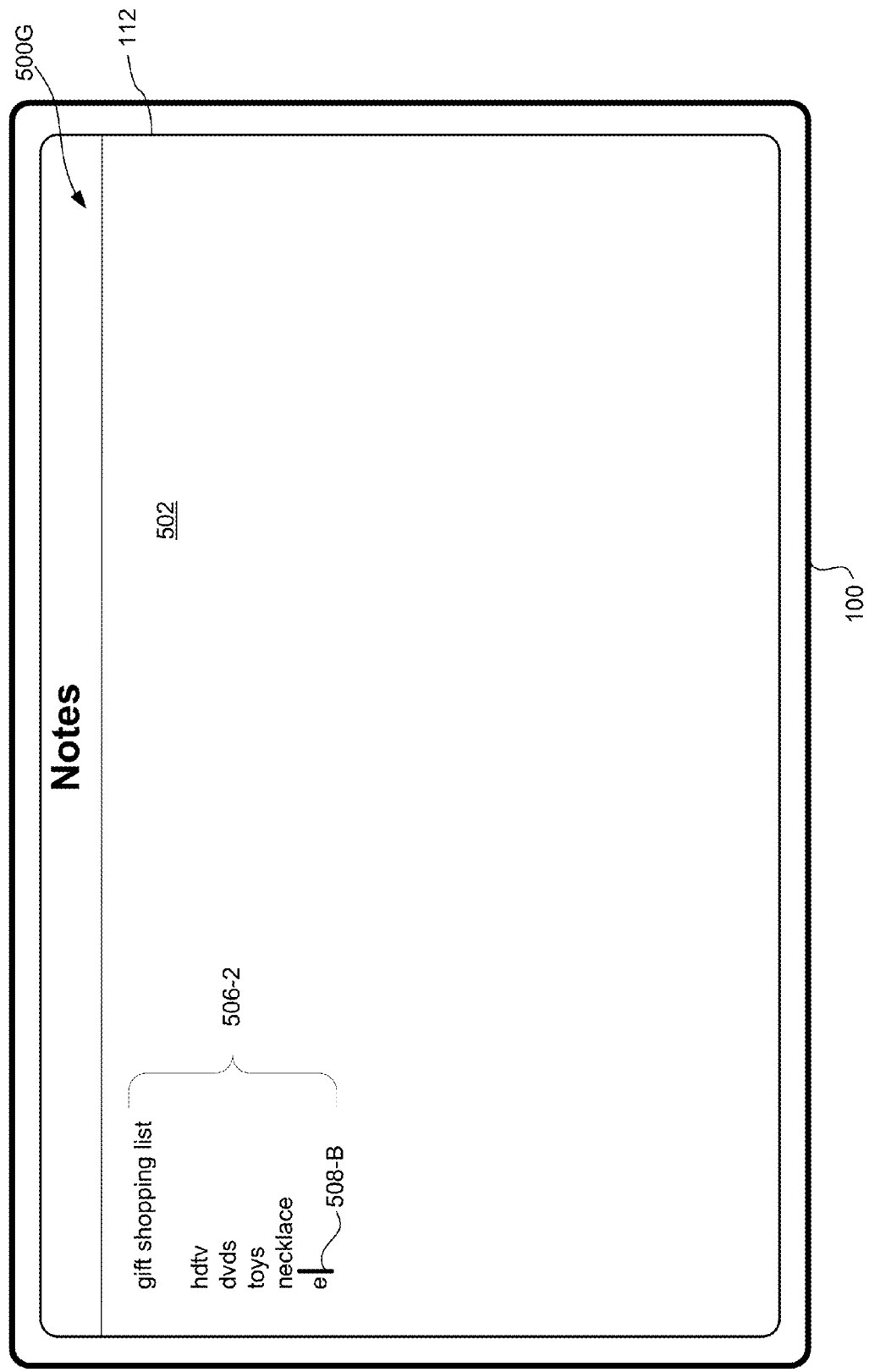
Figure 5H:
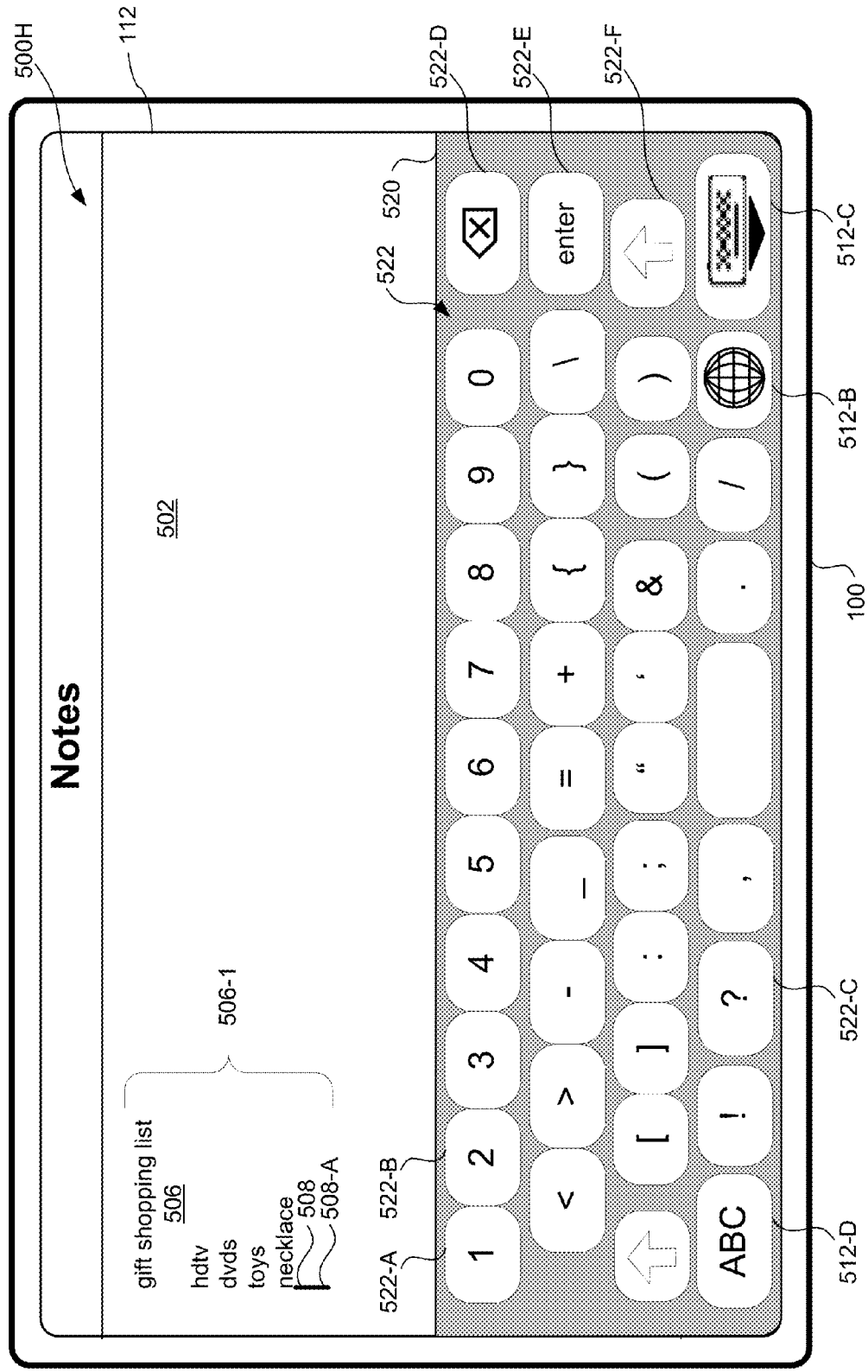
Figure 5I:
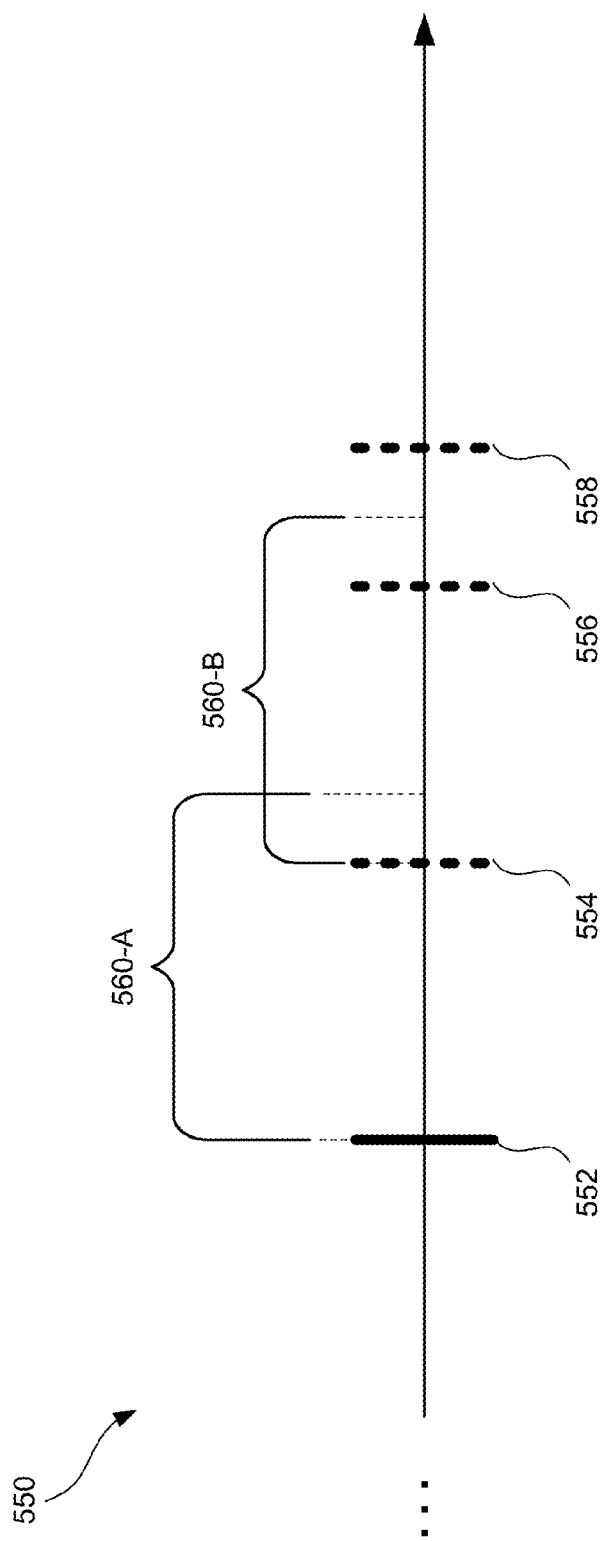

For example, in FIG. 5F, contact 518 is detected at location 518-C, which corresponds to conditionally enabled button 512-C. If contact 518 is detected at time 556, then button 512-C is activated in response to detection of the contact 518 because the period of time between time 552 and time 556 is above a threshold (the length of time window 560-A); time 556 is outside of time window 560-A. The effects of the activation include, for example, the hiding of the keyboard 504, as illustrated in FIG. 5G. If the contact 518 is detected at time 554, then button 512-C is prevented from being activated in response to detection of the contact 518 because the period of time between time 552 and time 554 is equal to or below the threshold; time 554 is on or inside of time window 560-A. In this case, the keyboard 504 is not hidden, and UI 500F continues to be displayed.

Some operations in method 600 may be combined and/or the order of some operations may be changed. While the above discussion of FIGS. 6A-6B (and the discussion below of FIG. 7) uses the terms "buttons," and "soft keyboards," other embodiments of methods 600 and 700 are applicable to user-initiated activations of objects other than buttons, such as non-keyboard icons. Furthermore, while method 600 describes conditionally and temporarily disabling the activation of certain buttons, also called conditional deactivation, other embodiments of method 600 are applicable to conditionally and temporarily enabling various buttons or other objects in the user interface of a device or of an application being executed by a device, which may also be called conditional activation. For example, in embodiments of method 600 in which the roles of operations 616 and 618 are reversed, the method temporarily and conditionally enables a particular set of buttons (e.g., keyboard buttons or non-keyboard buttons) or objects in response to activation of another button or object.

Figure 7:
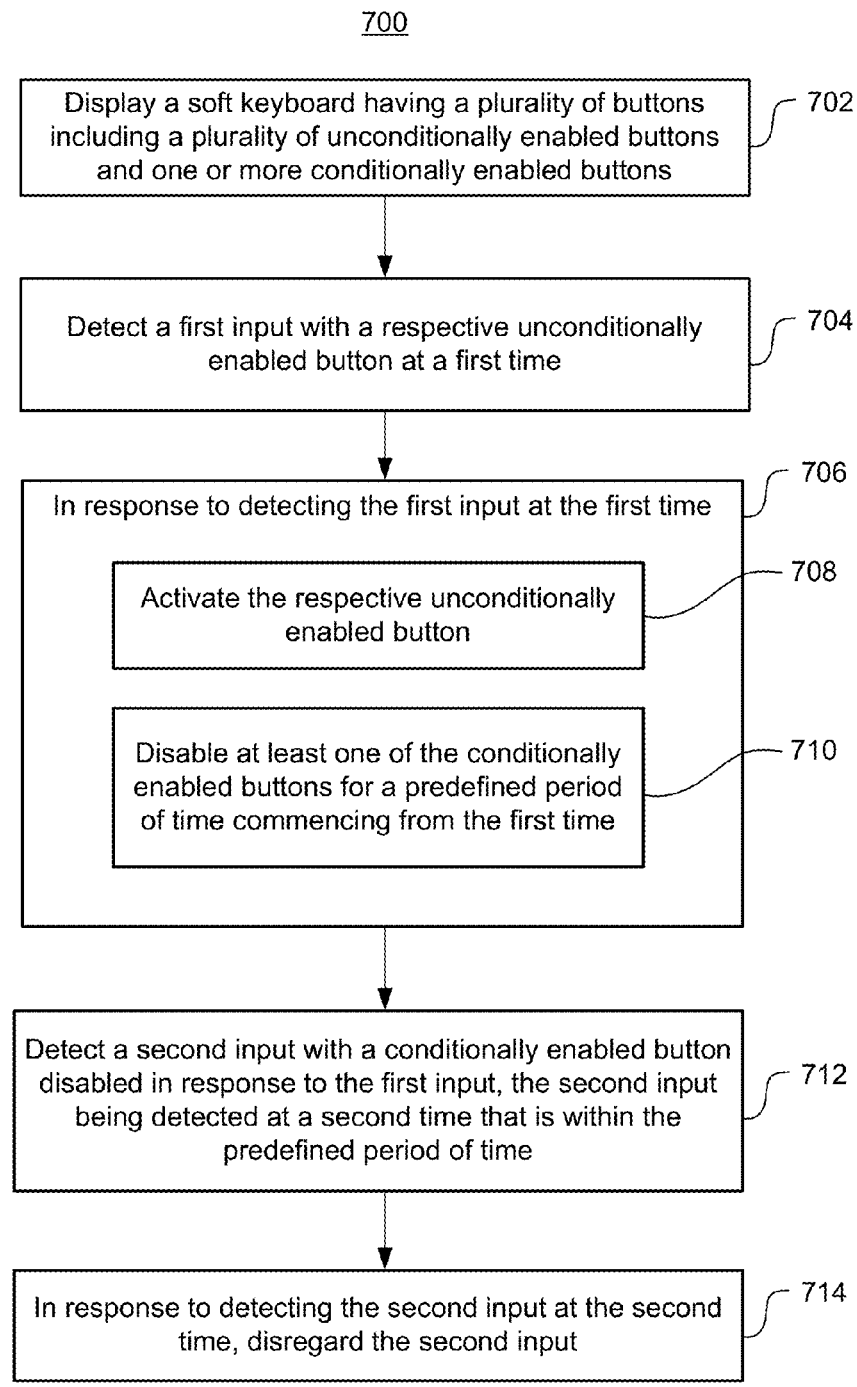
FIG. 7 is a flow diagram illustrating a method of activating buttons in accordance with some embodiments.

FIG. 7 is a flow diagram illustrating a method 700 of activating buttons in accordance with some embodiments. Method 700 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display.

As described below, method 700 provides an intuitive way to activate buttons. The method reduces the cognitive burden on a user when activating buttons, thereby creating a more efficient human-machine interface. For battery-operated computing devices, enabling a user to activate buttons faster and more efficiently conserves power and increases the time between battery charges.

The device displays (702) a soft keyboard having a plurality of buttons including a plurality of unconditionally enabled buttons and one or more conditionally enabled buttons. For example, in FIG. 5A, keyboard 504 is displayed on touch screen 112. Keyboard 504 includes buttons 510 and buttons 512, one or more of which (e.g., button 512-C) are conditionally enabled. As another example, in FIG. 5H, keyboard 520 is displayed on touch screen 112. Keyboard 520 includes unconditionally enabled buttons 522 and buttons 512, one or more of which are conditionally enabled buttons.

The device detects (704) a first input with a respective unconditionally enabled button at a first time. For example, in FIG. 5B, contact 514 (the first input) is detected at time 552 at location 514-A, which corresponds to unconditionally enabled button 510-C.

In response to detecting the first input at the first time (706), the device activates (708) the respective unconditionally enabled button and disables (710) at least one of the conditionally enabled buttons for a predefined period of time commencing from the first time. For example, in FIG. 5B, the device responds to the detection of contact 514 at location 514-A at time 552 by activating button 510-C. The effects of the activation include insertion of the character "e" 516 into input text 506 and movement of the cursor 508 to position 508-B. Further, in response to detection of contact 514, button 512-C is disabled during time window 560-A commencing from time 552.

The device detects (712) a second input with a conditionally enabled button disabled in response to the first input, the second input being detected at a second time that is within the predefined period of time. For example, in FIG. 5F, contact 518 is detected at time 554, which is within time window 560-A, at location 518-C, which corresponds to button 512-C, which is disabled in response to detection of contact 514 at time 552.

In response to detecting the second input at the second time, the device disregards (714) the second input. For example, the keyboard 504 is not hidden despite the contact 518 at location 518-C (i.e., UI 500F continues to be displayed); contact 518 at location 518-C is disregarded.

The above described methods and apparatus for implementing conditionally enabled buttons can be utilized, in other embodiments, to implement conditionally enabled or conditionally disabled keys, button or other objects in user interfaces other than soft keyboards.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

For example, the operations depicted in FIGS. 6A, 6B and 7 may be implemented by components depicted in FIGS. 1A-1C. For example, "detect a first input with a first button at a first time" (604) may be implemented by event sorter 170, event recognizer 180, and event handler 190. Event monitor 171 in event sorter 170 detects a contact on a touch-sensitive display 112, and event dispatcher module 174 delivers the event information to application 136-1. In this case, application 136-1 includes methods and graphical user-interfaces for manipulating a soft keyboard and text display region. A respective event recognizer 180 of application 136-1 compares the event information to respective event definitions 186, and determines whether a first contact at a first location on the touch-sensitive surface corresponds to a predefined event or sub-event, such as selection of a particular button or key in a soft keyboard. When the predefined event or sub-event is detected, event recognizer 180 activates an event handler 180 associated with the detection of a first contact. Event handler 180 may utilize or call data updater 176 or object updater 177 to update data or a text display region. Similarly, it would be clear to a person having ordinary skill in the art how other processes can be implemented based on the components depicted in FIGS. 1A-1C.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A multifunction device, comprising:
   a touch screen display;
   one or more processors;
   memory; and
   one or more programs, wherein the one or more programs are stored in the memory and configured to be executed by the one or more processors, the one or more programs including instructions for:
   displaying a soft keyboard having a plurality of buttons including one or more unconditionally enabled buttons and one or more conditionally enabled buttons, wherein each respective unconditionally enabled button of the one or more unconditionally enabled buttons is always responsive to an activation input on the respective unconditionally enabled button while the soft keyboard is displayed;
   detecting a first input with a first button at a first time;
   detecting a second input with a second button at a second time after the first time, wherein the second button is a conditionally enabled button; and
   in response to the detecting the second input with the second button at the second time:
   in accordance with a determination that the period of time between the first time and the second time is above a predefined threshold, activating the second button; and
   in accordance with a determination that the period of time between the first time and the second time is below the predefined threshold, preventing the second button from being activated.

2. The device of claim 1, wherein the one or more conditionally enabled buttons comprise a button for hiding the soft keyboard.

3. The device of claim 1, wherein the one or more conditionally enabled buttons comprise a button for changing a language associated with the soft keyboard.

4. The device of claim 1, wherein the soft keyboard is associated with a first language, and wherein the one or more conditionally enabled buttons comprise a button for switching to a soft keyboard associated with a second language.

5. The device of claim 1, wherein the one or more conditionally enabled buttons comprise a button for switching from an alphabet keyboard to a numbers and symbols keyboard.

6. The device of claim 1, wherein the one or more conditionally enabled buttons comprise a button for switching from a numbers and symbols keyboard to an alphabet keyboard.

7. A method, comprising:
   at a multifunction device with a touch screen display:
   displaying a soft keyboard having a plurality of buttons including one or more unconditionally enabled buttons and one or more conditionally enabled buttons, wherein each respective unconditionally enabled button of the one or more unconditionally enabled buttons is always responsive to an activation input on the respective unconditionally enabled button while the soft keyboard is displayed;
   detecting a first input with a first button at a first time;
   detecting a second input with a second button at a second time after the first time, wherein the second button is a conditionally enabled button; and
   in response to the detecting the second input with the second button at the second time:
   in accordance with a determination that the period of time between the first time and the second time is above a predefined threshold, activating the second button; and
   in accordance with a determination that the period of time between the first time and the second time is below the predefined threshold, preventing the second button from being activated.

8. The method of claim 7, wherein the one or more conditionally enabled buttons comprise a button for hiding the soft keyboard.

9. The method of claim 7, wherein the one or more conditionally enabled buttons comprise a button for changing a language associated with the soft keyboard.

10. The method of claim 7, wherein the soft keyboard is associated with a first language, and wherein the one or more conditionally enabled buttons comprise a button for switching to a soft keyboard associated with a second language.

11. The method of claim 7, wherein the one or more conditionally enabled buttons comprise a button for switching from an alphabet keyboard to a numbers and symbols keyboard.

12. The method of claim 7, wherein the one or more conditionally enabled buttons comprise a button for switching from a numbers and symbols keyboard to an alphabet keyboard.

13. A non-transitory computer readable storage medium storing one or more programs, the one or more programs comprising instructions, which when executed by a multifunction device with a touch screen display, cause the device to:
   display a soft keyboard having a plurality of buttons including one or more unconditionally enabled buttons and one or more conditionally enabled buttons, wherein each respective unconditionally enabled button of the one or more unconditionally enabled buttons is always responsive to an activation input on the respective unconditionally enabled button while the soft keyboard is displayed;
   detect a first input with a first button at a first time;
   detect a second input with a second button at a second time after the first time, wherein the second button is a conditionally enabled button; and
   in response to the detecting the second input with the second button at the second time:
   in accordance with a determination that the period of time between the first time and the second time is above a predefined threshold, activate the second button; and
   in accordance with a determination that the period of time between the first time and the second time is below the predefined threshold, prevent the second button from being activated.

14. The storage medium of claim 13, wherein the one or more conditionally enabled buttons comprise a button for hiding the soft keyboard.

15. The storage medium of claim 13, wherein the one or more conditionally enabled buttons comprise a button for changing a language associated with the soft keyboard.

16. The storage medium of claim 13, wherein the soft keyboard is associated with a first language, and wherein the one or more conditionally enabled buttons comprise a button for switching to a soft keyboard associated with a second language.

17. The storage medium of claim 13, wherein the one or more conditionally enabled buttons comprise a button for switching from an alphabet keyboard to a numbers and symbols keyboard.

18. The storage medium of claim 13, wherein the one or more conditionally enabled buttons comprise a button for switching from a numbers and symbols keyboard to an alphabet keyboard.

* * * * *